(12) United States Patent
Hayes

(10) Patent No.: US 7,140,596 B2
(45) Date of Patent: Nov. 28, 2006

(54) BOLT LAUNCHER

(76) Inventor: Roger Dale Hayes, 6501 Sheldon Rd., Amarillo, TX (US) 79109

( * ) Notice: Subject to any disclaimer, the term of this patent is extended or adjusted under 35 U.S.C. 154(b) by 212 days.

(21) Appl. No.: 10/867,026

(22) Filed: Jun. 14, 2004

(65) Prior Publication Data

US 2005/0087180 A1    Apr. 28, 2005

Related U.S. Application Data

(60) Provisional application No. 60/478,055, filed on Jun. 12, 2003.

(51) Int. Cl.
*B65H 59/00* (2006.01)
*H02G 1/08* (2006.01)
(52) U.S. Cl. .............................. 254/134.3 FT; 254/280
(58) Field of Classification Search ....... 254/134.3 FT, 254/280, 134.3 R; 81/487; 269/3, 6
See application file for complete search history.

(56) References Cited

U.S. PATENT DOCUMENTS 2,888,768 A * 6/1959 Taylor ........................ 42/1.14
3,059,630 A * 10/1962 Oreskey ...................... 124/27
4,056,859 A * 11/1977 Pace ............................ 7/107
4,449,429 A * 5/1984 Sauer et al. .................. 81/9.3
5,431,370 A * 7/1995 Verkuylen et al. .................. 254/134.3 FT
5,582,392 A * 12/1996 Bajric et al. .......... 254/134.3 R

* cited by examiner

*Primary Examiner*—Lee D. Wilson
(74) *Attorney, Agent, or Firm*—M. Conrad Huffstutler

(57) ABSTRACT

This invention is a spring-powered bolt launcher to facilitate tugging wire or cable between two locations; typically, the locations are in low light levels, are remote by about 10–20 meters and are above a suspended ceiling in a building. The present launcher includes a unique hoop-rocker-slide mechanism to assure safe, controlled and precise launching of a bolt from the origin toward the target. The present launcher system also includes unique combinations of spliced-sequential tethers capable of accurate placement even over ranges of 20–30 meters. The present launcher system is also disclosed in the form of field-configurable kits which are carried in a portable case including a group of selectable component trays. Once the bolt is attached to cable to be pulled, the tether allows the operator to tug cable to be connected between the locations.

9 Claims, 15 Drawing Sheets

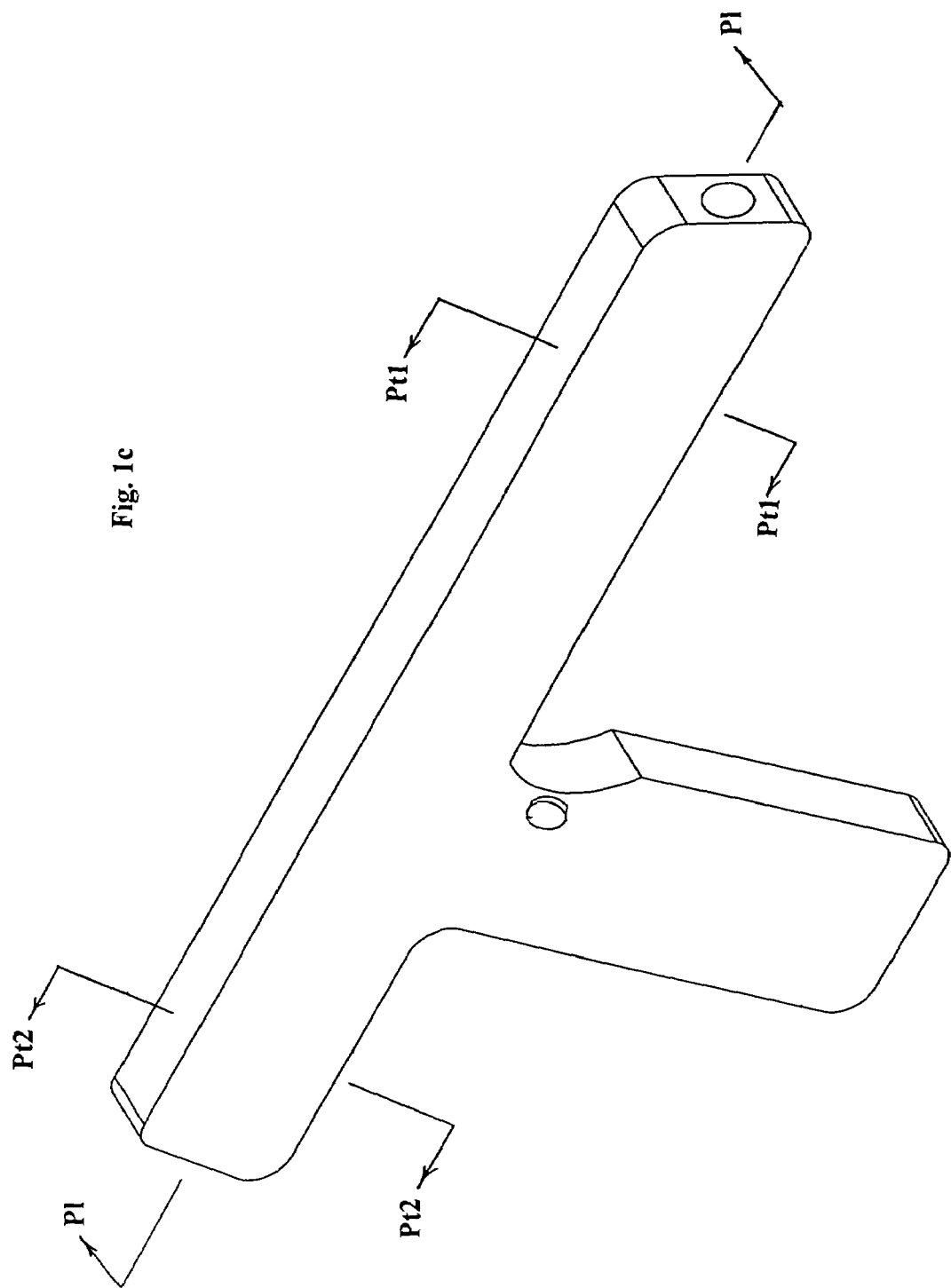

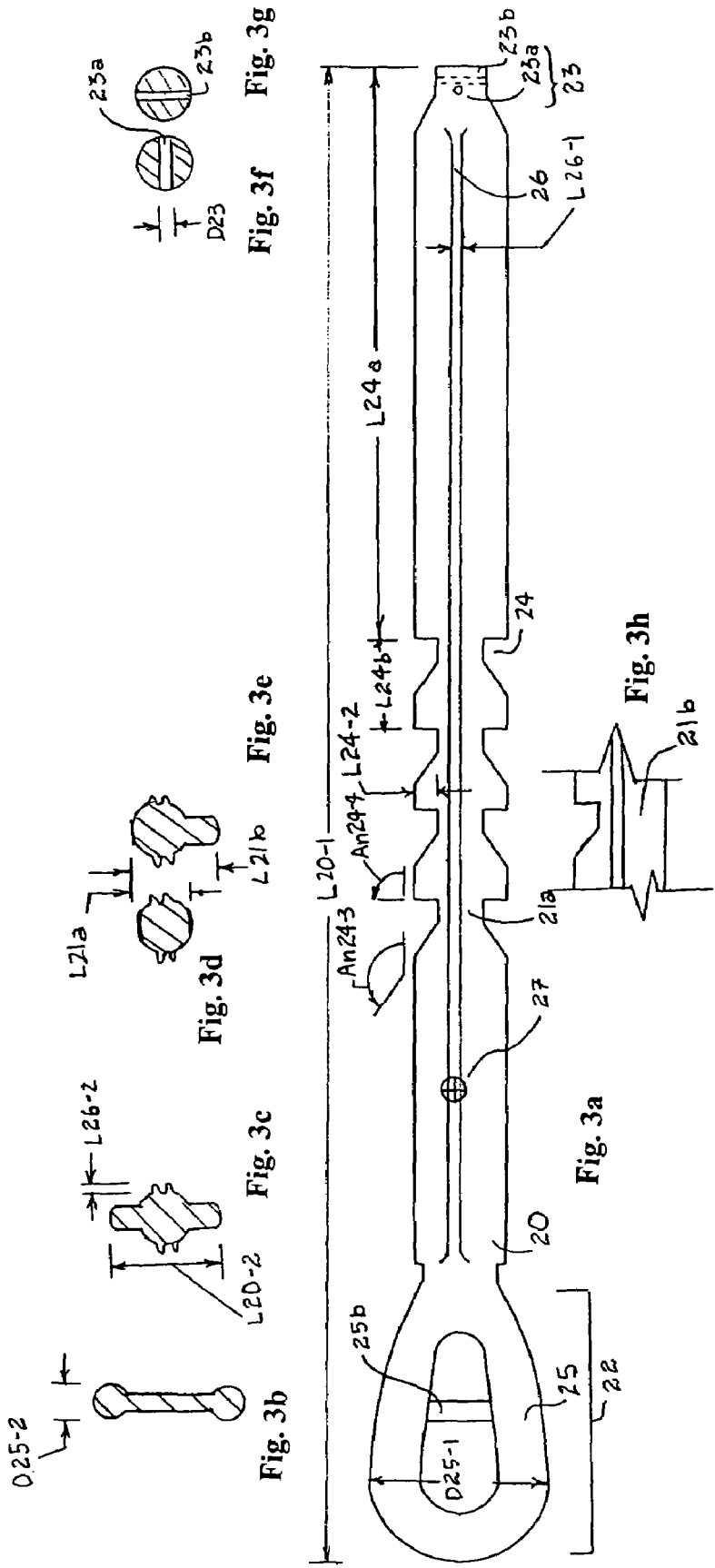

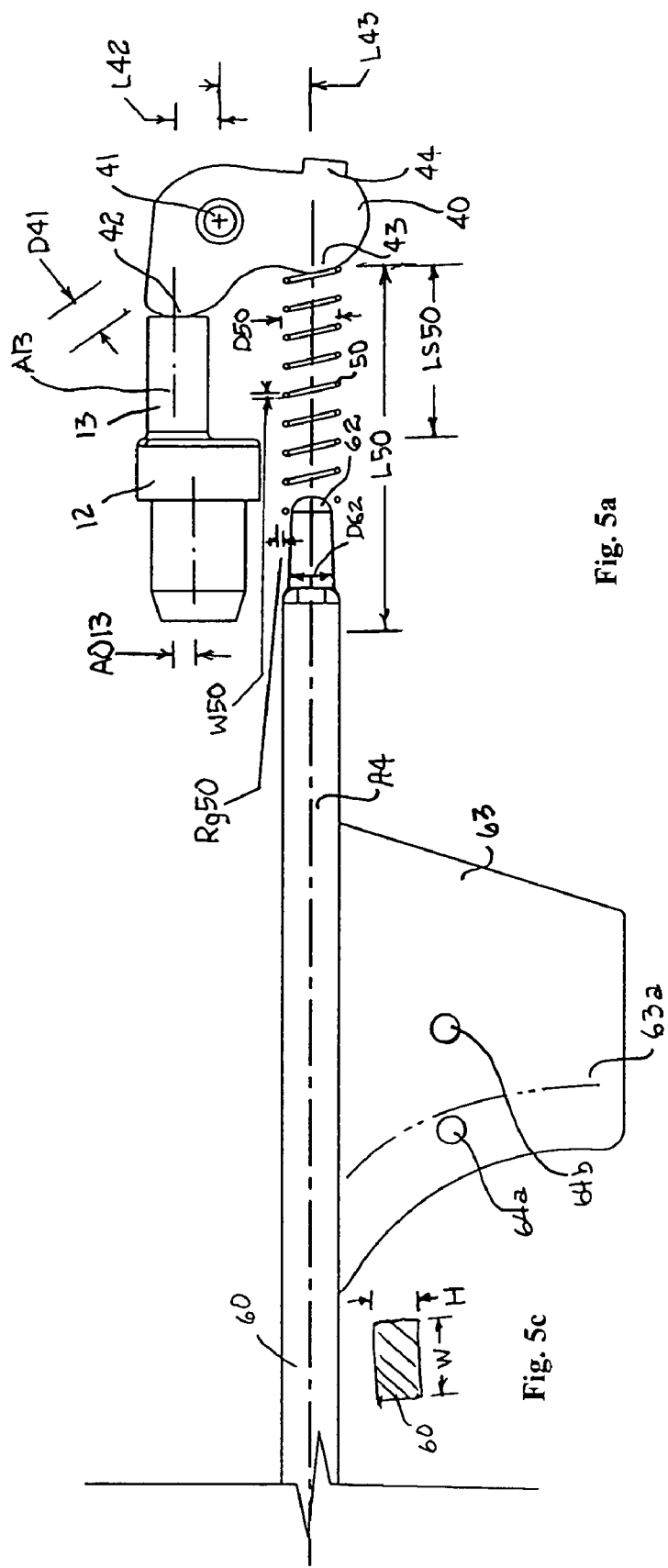
Fig. 5a
Fig. 5c
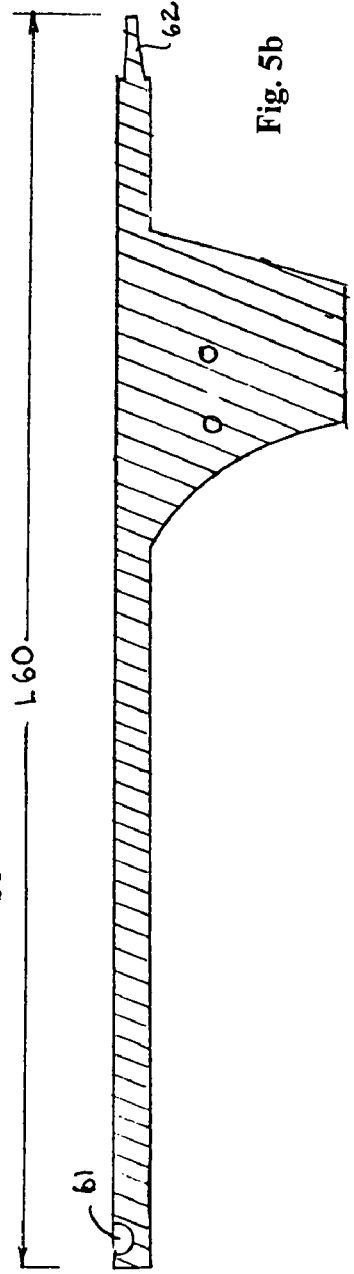
Fig. 5b

Fig. 6c

| PS1 -- Free Length= X1;  Rate= X1 |

| PS2 -- Free Length= Y1;  Rate= Y1 |

90

| PS3 -- Free Length= Z1;  Rate= Z1 |

| PS4 -- Free Length= Z2;  Rate= Z2 |

BOLT LAUNCHER

CROSS REFERENCE TO RELATED APPLICATION

This invention claims the priority of U.S. Provisional Application No. 60/478,055, filed Jun. 12, 2003.

SUMMARY OF INVENTION

This invention is a spring-powered bolt launcher which is adapted to propel a bolt pulling a tether to a target zone where a cable to be tugged back to the launch point can be attached and retrieved. The intended market is for pulling/retrieving cable across a darkened, inaccessible ceiling space over a distance of about 20 meters. Because the present invention is extremely compact, operable with one hand and capable of highly accurate bolt placement even with a heavy tether and target spacings up to 20 meters, it offers many advantages over known bulky/dangerous systems such as gunpowder-drive guns, air-drive spear guns, and bow-and-arrow methods. The present launcher uses a balanced hoop release, rocker and follower spring to control the amount of release force and the off-axis displacement of the bolt at the moment of release. This advanced trigger-release configuration avoids the many design errors and operational weaknesses found in other systems for launching a bolt.

BRIEF DESCRIPTION OF FIGURES

FIG. 1c is an isometric schematic view of the body as a simple extrusion; this view defines the several cutting planes for sectional views of the release mechanisms. P1 denotes a vertical-longitudinal cutting plane used for longitudinal sections. Pt1 denotes a vertical plane transverse to the guide-tube axis in the distal body zone used for transverse sections of the bolt and other components. Pt2 denotes a vertical plane transverse to the guide-tube axis in the proximal body zone used for transverse sections of the spring, attached spring plugs and other components.

FIG. 3a is a side view of the bolt.

FIG. 3b is a transverse cross sectional view of the bolt loop portion which cuts through the transverse bar, 25b and lies perpendicular to the long axis of the bolt.

FIG. 3c is a typical transverse cross sectional view of the bolt showing the full height, L20-2.

FIG. 3d is a transverse cross sectional view of the smallest part of the bolt, taken at the bottom of the notch.

FIG. 3e shows the transverse cross section of an alternative embodiment asymmetric bolt (notches on one edge only) which has a larger section area and more desirable radius of gyration re column compression bending.

FIG. 3f shows a transverse cross sectional view of the bolt at the location of the horizontal hole, 23a.

FIG. 3g shows a transverse cross sectional view of the bolt at the location of the vertical hole, 23b.

FIG. 3h shows a partial side view of the asymmetric bolt (notches on one edge only).

FIG. 5a shows a side view of the proximal plug, rocker and a partial view of the proximal portion of the slide; the follower spring is shown in section so that important dimensions can be clearly indicated.

FIG. 5b is a longitudinal cross sectional view of the slide.

FIG. 5c shows the section of the slide member along with H and W dimensions.

FIG. 6c is a schematic view which illustrates a typical array of alternative power springs.

DETAILED DESCRIPTIONS OF PREFERRED EMBODIMENTS

Figure 1A:
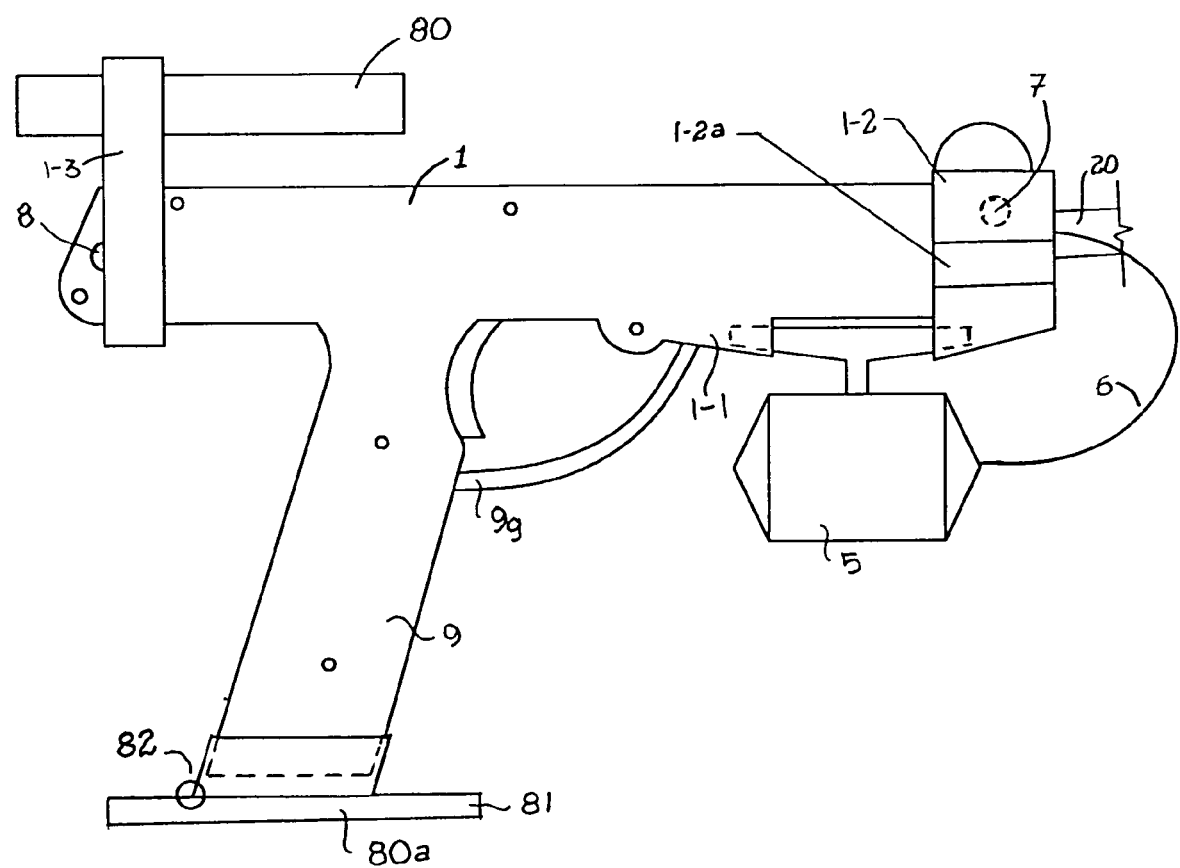
FIG. 1a is a side view of the launcher showing the main body features, an inserted bolt, tether and tether store and tether-store mounting collar.
Figure 1B:
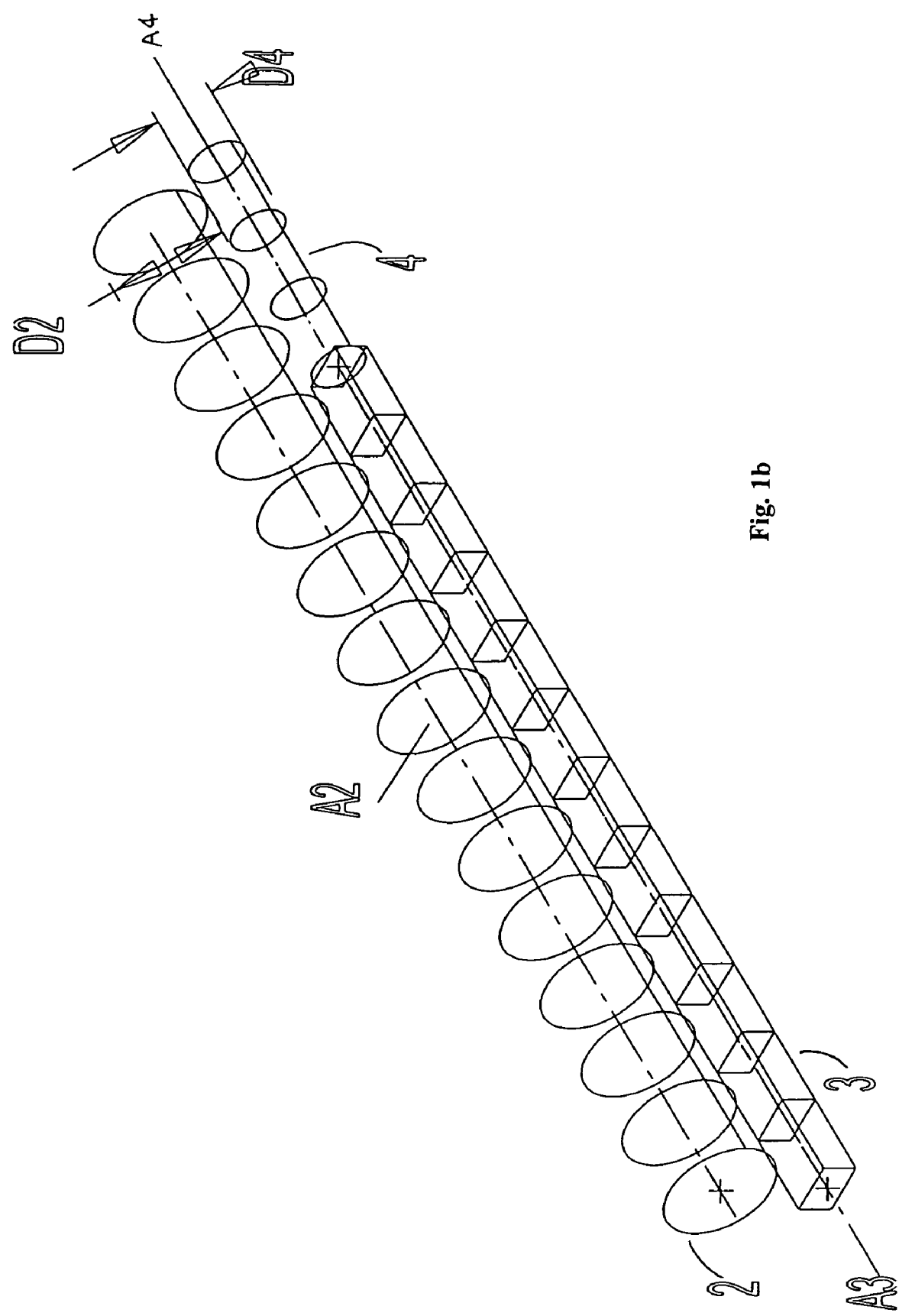
FIG. 1b is a isometric view of the wireframes which describe the several internal cavities of the body and their positions.

Table 1 includes a complete listing of major invention features and definitions of special nomenclature.

Body Features (1–9, see FIGS. 1a, 1b, 1c and 1d)

The characteristics of the assembled bolt launcher body 1, is prepared as two mating halves which are assembled with internal components and fastened with screws. The body halves contain several internal features as detailed below.

Mating alignment features are provided in the halves to assure final geometry of the internal channels. Typically, the halves are injection-molded polymer and little secondary shaping is needed.

The guide tube 2 is an internal circular channel which is configured to enclose the power spring, related plugs and the bolt (when inserted); the length is approx. 210 mm and the ID, denoted D2, is approx. 12 mm. By control of mold design, molding cycles and assembly for all-polymer embodiments, the guide-tube ID straightness and roundness are both held to tolerances of approx. 0.1 mm relative to the cylinder axis A2; this is desired for accurate operation.

The slide channel 3, or first body channel, is a rectangular channel approx. 200 mm in length with a section of approx. 12 mm (W) by approx. 5 mm (H) and adapted to guide the slide in its movements parallel to the axis of the guide tube. The centerline of the slide channel is displaced vertically below the centerline of the guide-tube axis by approx. 14 mm. The interior surfaces of the slide channels are checked for smoothness and straightness prior to assembly.

The follower-coil spring channel 4, or second body channel, is a circular channel approx. 30 mm in length and approx. 8 mm ID, denoted D4, adapted to enclose the bias compression spring abutting the slide and the rocker. The axis of the follower-spring channel, A4, is displaced vertically below the guide tube axis by approx. 14 mm.

The tether store 5, which contains a length of tether, 6, is attached to the body by two cooperating elements: (a) socket 1-1 in the body and (b) an external barrel collar 1-2 which slides over the muzzle end and is retained by friction. These two elements mate with wedge-shaped tabs extending from the base of the tether store and attach it firmly to the underside of the body, just behind the muzzle. Alternative tether stores with different tether characteristics can thus be easily and quickly exchanged on the body for a specific task.

The body contains a opposed pair of mating socket holes, 7, for the pivot trunnions of the hoop release. These are opposed, cylindrical socket-holes approx. 5 mm ID, denoted D7, which extend through the body wall and allow the hoop release to pivot and also to support the applied forces from the slide and the power spring.

The body contains a pair of opposed, mating socket holes, 8, for the trunnions of the rocker. These are cylindrical holes approx. 5 mm ID, denoted D8, which extend through the body wall and allow the rocker to pivot and also support the applied forces from the slide and the power spring.

The body is provided with a handgrip portion, 9, to facilitate convenient pointing; a trigger guard, 9g is also provided to reduce the chance of accidental or unintended trigger operation. The grip and trigger guard are proportioned for a human hand and may be sized for hands of varying sizes. For an all-polymer embodiment, internal webs and ribs support the flat surfaces of the grip and optimize plastic flow during mold filling.

Materials, Finishes. The body and internal features may be prepared by combining molding, stamping, forging and chip-cutting operations; however, excellent results have been obtained with injection molding of polycarbonate compounds. While polycarbonate is desirable for impact resistance, there are many other engineering polymers which are usable. Smooth surfaces and flash free edges are necessary for the internal cavities which house sliding or rotating components; the grip and trigger surfaces which contact the operator's hand/fingers may be made textured by many die or secondary machining methods including: knurled, ribbed or knobby-tape.

Work Light, Leveling, Aiming/Laser Pointing. These and other accessories may be attached to the top or side exterior surfaces of the body by a variety of methods, such as a molded base on the body exterior to allow removable screw-mounting of a socket for a laser-aiming device or a removable breech collar 1-3 which slides over the proximal body portion and is retained by friction. Accessory devices such as used for aiming or work-zone illumination are attachable to a mating socket 1-3a in the breech collar.

Spare Bolt Holder. The external barrel collar 1-2 may also be fitted with an external snap-in groove 1-2a to carry a spare or alternative bolt.

Figure 2:
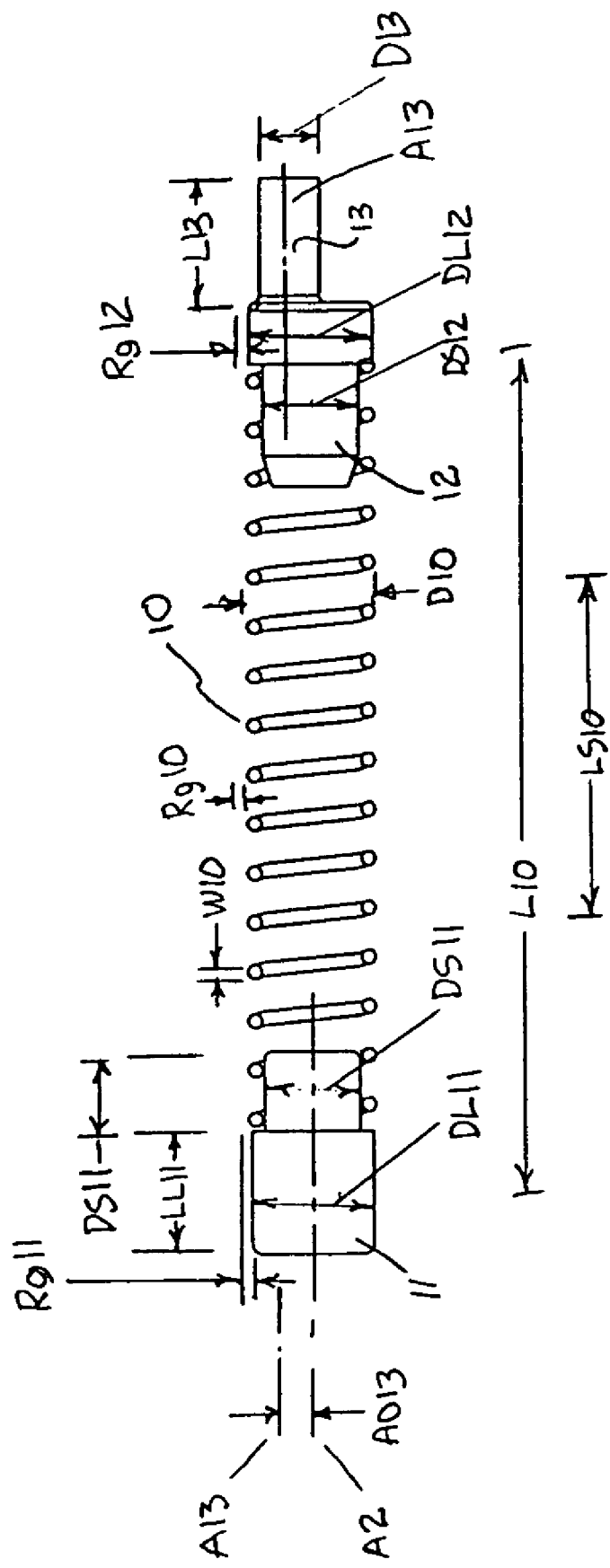
FIG. 2 is a section view of the distal plug, the power spring and the proximal plug.

Power Spring & Plugs (10–13, see FIG. 2)

All spring parameters are described in detail in Table 1. FIG. 2 shows details of the power spring and its attachments to the distal and proximal plugs. The power spring ends are shown as plain, but other styles have been used by compensation of the engaged-section of the end plugs.

The main power spring 10, is a cylinder-coil of spring steel and designed for compression by manual bolt insertion. The power spring is sized for low-friction, high-velocity sliding movement within the guide tube; at maximum-compression, the radial gap between its OD and the ID of the guide tube, denoted Rg10, must be at least 0.1 mm (spring centered in the GT). The power-spring characteristics are: free OD, denoted OD10, 12–14 mm; the wire diameter, denoted D10, is 1–2 mm; the free length, denoted L10, is 150–160 mm; the rate, denoted as F10, is 700–1100 Newton/meter; the solid length, denoted LS10, is 30–50 mm. The end styles are plain, both ends.

Attachments/Coatings. The power spring is connected to both the distal and proximal end plugs so that correct alignment of their axes with the guide-tube axis, A2, is maintained during compression and release stages. Selected surfaces of the power spring may also be coated with films or layers to: (a) reduce sliding friction with the interior surfaces of the guide tube or (b) prevent corrosion.

PS Materials, Finishes. The power spring may be prepared of any suitable spring alloy by compensating for elasticity and strength; excellent results have been obtained with steel spring materials such as ASTM A227 to A232 stock, A313 or A401. Power springs may be coated with single or combination surface films/conversion coatings which reduce sliding friction in the guide tube and/or provide corrosion protection.

Distal & Proximal End Plugs (11 and 12, see FIG. 2).

All plug parameters are described in detail in Table 1. Both plugs are sized for free sliding movement in the guide tube, e.g., the radial gap between the plug and the guide tube ID, denoted Rg11 or Rg12 respectively, must be at least 0.1 mm (plugs centered in GT).

The distal plug, denoted 11, is formed of two back-to-back cylinders aligned on the same axis. The smaller cylindrical portion of length approx. 5–12 mm, denoted LS11, which extends into the inside of the power spring; the OD of this portion, denoted DS11, is less than the ID of the power spring and in the range 7–12 mm. The length of the larger section, denoted LL11, is 9–15 mm and its OD, denoted DL11, is in the range 11–20 mm.

The proximal plug, denoted 12, is formed of two back-to-back cylinders aligned on the same axis and a third cylinder extension 13, offset slightly from the axis, which protrudes from the larger cylinder. The length of the larger section is approx. 7 mm and its OD, denoted DL12, is 12 mm. The smaller cylindrical portion is of length approx.

5–12 mm, which extends into the inside of the power spring; the OD of this portion, denoted DS12, is about 10 mm.

Proximal Plug Extension (13). The proximal plug has an offset extension, 13, which is approx. 6 mm OD, denoted D13, and approx. 13 mm long, denoted L13. The offset of the axis of the extension from the axis of the proximal plug is approx. 3 mm, denoted AO13. The proximal plug extension is integral and slides parallel to the spring axis A1 in a mating body channel in order to transmit force between the spring and the rocker. Because the power spring is connected to the proximal plug, it can only move in a direction parallel to the guide-tube axis and rotation about axis A2 is limited.

Plug Materials, Finishes. The plugs are subject to moderate compressive stresses during loading of the bolt; therefore, a wide variety of molded polymers, alloys and metals can be used. The exterior surface of both plugs may be coated with lubricant solid films, gel layers or liquid coatings to reduce sliding friction within the guide tube.

Bolt (20, see FIGS. 3a, 3b, 3c, 3d, 3e, 3f, 3g, 3h)

Bolt Shank Dimensions. Length, form and sections (shapes/areas) and principal notch angles are shown in Table 1 and FIG. 3a–3h. A typical bolt is prepared with three notches which allow three differing amounts of launch energy and related launch velocity/range. The middle portion of the bolt is subject to maximum column buckling-failure stresses and its sections have been carefully designed to resist elastic bowing in the direction of lower radius of gyration.

Bolt Notch Positionings/Spacings. The bolt is prepared with one or more notches at a predetermined spacing, L24a, from the proximal end; for a selected power spring, this defines the available launch energy, which in turn controls trajectory. If multiple notches are provided, their engagement faces are spaced apart a distance, L24b; the spacing distance may be either a uniform value or a sequence-graded value, taking into account the bolt stiffness, mass and tether-playoff resistance. For a specific target distance, bolts may also be prepared with a single notch and provided with a unique visible or tactile range marking. For high-rate power springs, it may be desirable to prepare special bolts with notches along only one edge rather that along two edges; this provides additional bolt-column stiffness in the case of molded polymers. A typical type-1 bolt-shank section is shown in FIGS. 3a and 3d; this embodiment, defined by the section height L21a, exhibits sufficient elastic-column stiffness for low-to-moderate PS loading forces. FIGS. 3e and 3h show a typical type-2 bolt-shank section with height dimension L21b, which is stiffer and desired for moderate-to-high PS loading forces.

Bolt Notch Dimensions/Angles. The particular shape of the notch faces are detailed in FIG. 3 to illustrate the interactions with the claw surface during release. In bolt-notch design, care has been given to select the combination of shank stiffness, claw angle and latch angle An24-4 so that minimal upward deflection of the bolt will occur at the moment of release, even with maximal spring force. The notch entry angle An24-3 has been carefully adjusted to provide easy insertion of the bolt through the hoop even with a moderate force exerted by the follower spring.

Bolt Proximal End Features and Tether Attachments. The shape of the proximal tip of the bolt, 23, is basically a hemisphere-tipped rod with a transverse hole 23a or 23b through which the tether end is threaded and attached mechanically with a knot or clip or by adhesive bonding/welding, It is important to make the attachment as compact as possible so that the tether portion adjacent the hole or knot free ends do not interact mechanically with the hoop opening or claw during discharge. The tether hole axis may be oriented either parallel to the plane of the loop (23b) or perpendicular to the plane of the loop (23a). The parallel-oriented hole axis allows for the tether to rotate inside the hole as the tether playout is beginning; this is desirable for heavier/stiffer tethers. The perpendicular-oriented hole axis requires bending flexure of the tether adjacent the hole during playout; this is acceptable for light, supple tethers.

Distal End Features/Dimensions. The distal end of the bolt is denoted generally as 22. A bolt formed with a distal loop, 25, is shaped to provide a safe, rounded end for a low-pressure impact in case the bolt accidentally strikes a delicate surface or a person. The loop is generally a circular profile of diameter D25-2 swept along a teardrop path, generally D25-1. The loop opening is sufficient to accept threading-through hitching of typical communications cable to be retrieved back toward the launch point.

Bolt Surface Tether Tunnel. To deter unintended mechanical interference between the tether along the length of the inserted bolt and the hoop, particularly adjacent the claw portion and the bolt notch, the bolt is provided with open axial tunnels, 26, along both side surfaces. During bolt insertion, the operator must take care to hold the tether taut between the attachment and the loop, i.e., securely within a single slot. For the tunnel width, L26-1, and depth, L26-2, ranges shown in Table 1, entanglement is usually no problem with supple, non-curly tether.

Bolt Center of Mass & Weighting Factors. Ideally, stable flight trajectory of the bolt can be achieved if force to overcome the resistance of tether playoff is completely axial to the bolt. Bolt axis alignment parallel to the trajectory is best achieved by design of the bolt so that its inherent center of mass is near the distal tip; this can also be done by attachment of a dense metal weight within the loop. Having the mass concentrated toward the distal end avoids uncontrolled tumbling motions during the bolt trajectory, which are extremely adverse to full range and accurate targeting. For a bolt mass of a few grams, trajectory weights of up to 25 grams have been found appropriate. For a molded polymer bolt as shown in FIG. 3, the center of mass, 27, (without a dense insert or attachment) is approximately as shown; this location has been found to be successful for a wide variety of tethers and power springs.

Bolt Materials, Finishes. In principle, the bolt can be made of molded/cast polymers, fired ceramics or metal alloys. Polymers with or without metal inserts for weighting, stiffening or notch wear resistance are used as needed for particular applications. At each use, care should be taken to assure that the bolt is free from axial bowing and notch surface wear and degradation of the latch angle. The tether tunnel and latch-face surfaces should be smooth molded finishes and regularly checked to assure freedom from debris and damage.

Figure 4B:
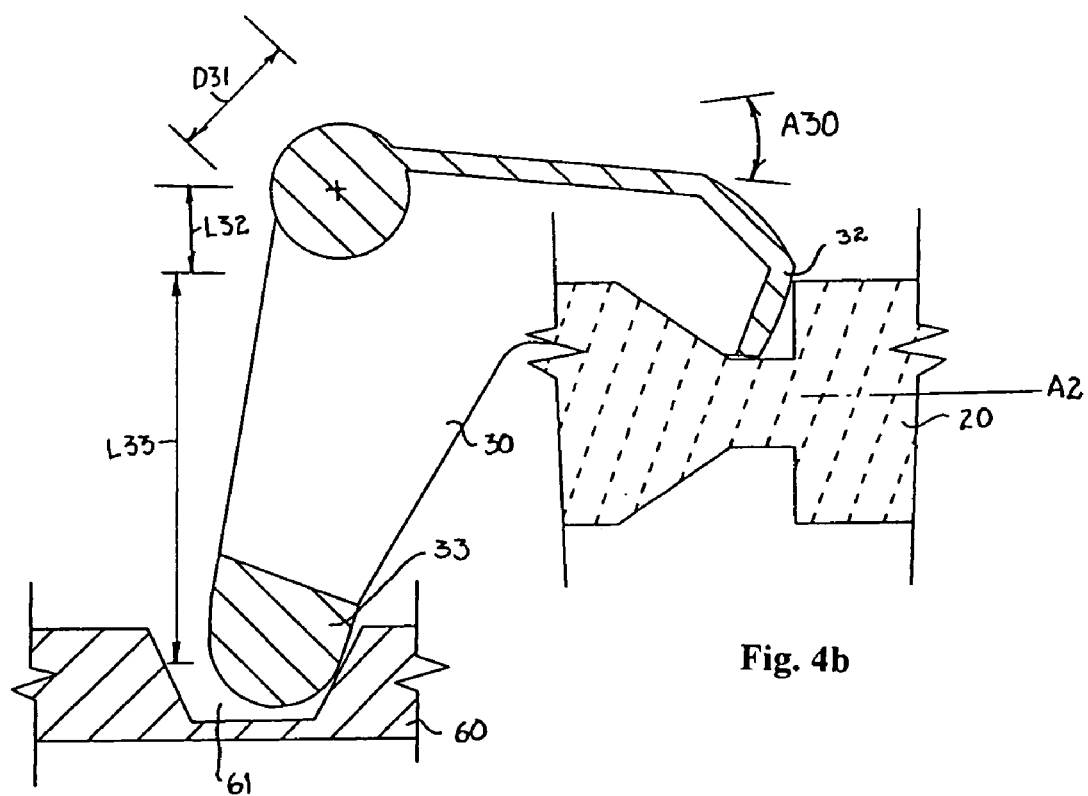
FIG. 4b shows a longitudinal cross section view of the hoop in a fully-engaged orientation relative to partial sections of the slide and bolt.
Figure 4A:
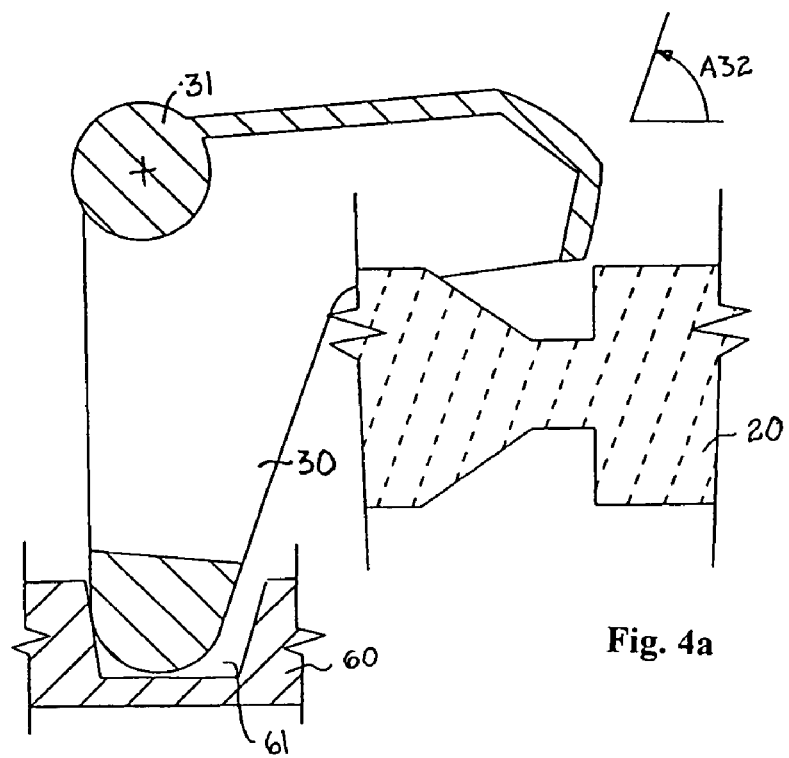
FIG. 4a shows a longitudinal cross section view of the hoop in a disengaged orientation relative to partial sections of the slide and bolt.

Hoop (30, see FIG. 4a, 4b)

General Shape & Functions. As can be seen from FIGS. 4a–b, the hoop, 30, is a pivoting, hollow-frame element through which the bolt is inserted and is released. It is essentially a square frame with a pair of opposed trunnions, 31, a notch-engagement claw, 32, and a slide-engagement pin, 33; the claw support arm extends away from the plane of the frame at approximately a right angle. The main functions are: (a) to allow the bolt to be inserted and discharged through the central opening and (b) to engage the claw into a selected bolt notch and hold the power spring in a compressed state. The hoop, which is coupled by its pin to the slide, pivots over a narrow angular range between the engaged and release positions.

Form & Dimensions. Table 1 lists the important hoop-design parameters. The hoop pivots about an axis centered in the trunnions over an angle A30 in the range of about 11 degrees from "fully engaged" to "fully disengaged" with the bolt notch; this translates into a lateral movement of about 4 mm of the slide socket, 61, which engages the pin extension from the bottom of the frame portion. The claw angle at the point of bolt release, A32, is in the range 80–90 degrees; this angular range is found optimal relative to trajectory and ease-of-use factors.

Hoop Claw Force & Notch Friction Analysis. During rotation from "engaged" toward "released", the hoop is subject to the following forces: (a) the force PS exerted by the compressed power spring and directed along the axis of the guide tube and (b) the force FS exerted by the slide in the opposite direction and parallel to the axis of the slide. Because the PS force is much larger than the FS force, the hoop is urged toward full engagement of the claw into the bolt notch. Since the hoop-claw lever arm L32 is much shorter than the hoop-pin lever arm L33, the torque required to rotate the hoop claw in contact with the bolt notch is predominantly the sliding-friction force between the surfaces at the spring force. Because the hoop trunnions are relatively large, the frictional resistance to its slow rotation is not an important factor in the force which must be applied to the slide to release the bolt.

Materials, Finishes. The hoop may be fabricated from many types of materials including polymers, alloys and ceramics. Likewise many industrial processes such as injection molding, casting, chip shaping, stamping/forging and sintering may be used with appropriate materials. Ideally, the surface finish of the trunnions and claw contact surface, which engages the bolt notch, are smoothed to assure area rather than line contacts.

Rocker (40, see FIG. 5a).

General Shape & Functions The rocker 40 is an L-shaped pivoting element, supported for rotation over a limited angular range on the axis of a pair of opposed trunnions 41; it transfers force from the contact point of the proximal plug extension 13 to the end of follower spring 50. The trunnion rotation axis, 41, is positioned between the two loading points. For low-friction rocker rotation, both the PPE contact face 42 and the FS contact face 43 are generally cylindrical. The PPE-RT lever arm, L42, is much shorter than the FS-RT lever arm, L43, and on the opposite side of the pivot point; this configuration assures a light contact force between the rocker-follower-slide whenever a bolt is engaged against the power spring. Due to "bottoming" of the proximal plug at the guide tube end, the rocker has a limited angular range of clockwise rotation. Due to a stop 44 on the rocker proximal face which hits the body inner wall, counter-clockwise rotation of the rocker is also limited.

Form and Dimensions. The form and dimensions of the rocker are all given in Table 1.

Materials, Finishes. The rocker may be fabricated from many types of materials including polymers, alloys and ceramics; many industrial processes such as injection molding, casting, chip shaping, stamping/forging and sintering may be used for manufacture. Ideally, the surface finish of the rocker trunnions and its contact surfaces, 42 and 43, are smoothed to assure area rather than line contacts.

Follower Spring (50, see FIG. 5a)

General Shape & Functions Functionally, the follower spring 50 serves to provide just enough force against the slide to keep its socket against the hoop pin in the released state.

Form and Dimensions. The form, dimensions and properties of the follower spring are all given in Table 1. The end style of both ends is plain.

End Attachments. The follower spring is secured over the tapered slide tang, 62, by friction, encompassed within the follower spring channel and abutted by the FS contact face, 43, of the rocker.

Materials, Finishes. The follower spring may be prepared of any suitable spring alloy by compensating for elasticity and strength; excellent results have been obtained with steel spring materials such as ASTM A227 to A232 stock, A313 or A401. Follower springs may be coated with single or combination surface films/conversion coatings which reduce sliding friction in the follower spring channel and/or provide corrosion protection.

Slide (60, see FIGS. 5a–5b)

General Shape & Functions. The slide 60 is an elongated rectangular bar which reciprocates in the slide channel 3 over a limited axial range and transfers force applied to the trigger extension 63 to the hoop to overcome rotational resistances to move the hoop toward its released position. The trigger extension is a flat flange portion which extends below the axis or centerline of the slide channel. The proximal tip of the slide is a conical tang 62 sized to engage the inner surfaces of the follower coils and thereby establish a secure connection. The distal portion of the slide has a socket recess, 61 extending from the upper surface through most of the thickness; this socket provides back-and-forth mechanical connection with the hoop pin 33.

Form and Dimensions. The form and dimensions of the slide are all given in Table 1.

Distal End Details. The distal end of the slide contains the socket 61 which actuates the hoop pin 33 as the slide is moved. In section, the socket pin-contact faces may be either flat or cylindrical; the spacing between the contact faces is set to closely match the contact shape of the hoop pin 33, thereby reducing the "slack travel" distance of the slide before hoop movement is initiated.

Proximal End Details. The proximal slide end is formed into a tapered, truncated conical tang 62 which attaches frictionally inside the coils of the follower spring.

Trigger. The trigger extension of the slide, 63, is a shaped, flat extension from its lower surface intermediate the two ends. Since usual trigger forces are in the range 1–5 N, there typically are low stresses in the extension or adjacent areas of the slide. In the "engaged" position, the trace of the edge of the body upon the trigger extension is shown approx. as 63a.

Materials, Finishes. The slide may be fabricated from many types of materials including polymers, alloys and ceramics; many industrial processes such as injection molding, casting, chip shaping, stamping/forging and sintering may be used for manufacture. Ideally, the surface finish of the slide exterior and the contact surfaces of the slide pin socket 61 are smoothed to assure area rather than line contacts.

Safety Latch Embodiments. Ideally, safety latches for the present launcher trigger are simple external or integrated devices which prevent proximal movement of the slide once a bolt is inserted against the compressed spring.

Integrated Sliding Latch Pin. By drilling a small "latch hole" through a hidden portion of the trigger extension inside the body, slide movement can be effectively prevented by insertion of a transverse-sliding, close-fitting cylindrical pin, which is secured into that body half by a cavity, and into the hole. Such a latch would be provided with an extension to be actuated by the used from outside the grip and possibly a light spring to bias the position toward "off". In this safety-latch embodiment, both the latch hole and the latch pin would be enclosed and not subject to debris accumulation. The location of the integrated latch pin and safety hole are designated as 64b (see FIGS. 1c and 5a).

External Blocking Pin. By providing a through "latch hole" in the exposed trigger-extension portion immediately adjacent the edge of the handgrip portion of the body, it is possible to insert a tight-fitting "blocking pin" through the hole. After insertion, no slide movement is possible. When not in use, the "blocking pin" may be inserted in a prepared, mating recess/slot/clip or alternatively attached to the handgrip by a short cord. In this embodiment, the latch hole and the blocking pin could be easily monitored for wear, contamination and damage. The location of the safety latch hole for the external safety is designated 64a (see FIG. 5a).

Figure 5D:
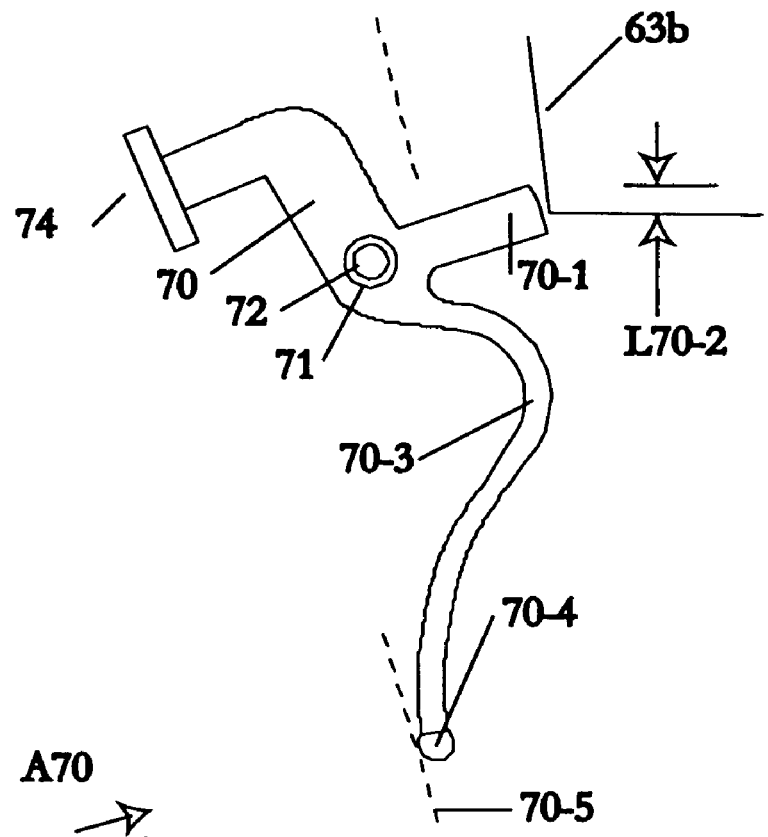
FIG. 5d shows an schematic outline view of the automatic pivoting grip safety on the "on" state, the trace of the slide trigger extension in the engaged position and the trace of the travel limit surface which contacts the ball-end tip.
Figure 5E:
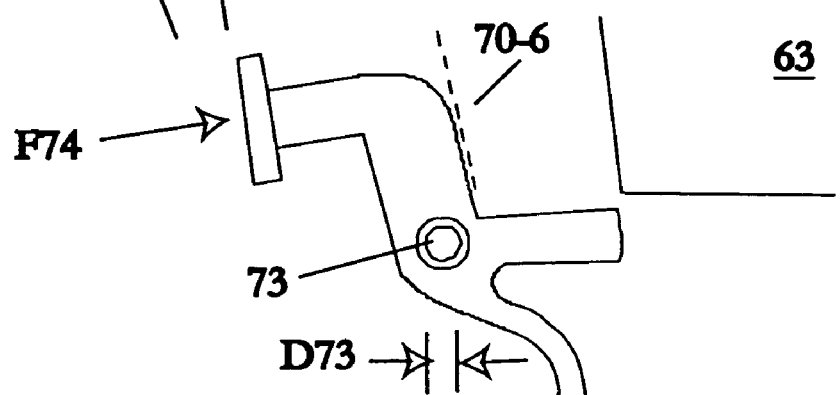
FIG. 5e shows an outline view of the automatic pivoting grip safety rotated to the "off" state along with traces of the rotation-travel-limit feature on the interior of the handgrip and indicates the shape change and tip displacement of the deflected, curved portion.

Automatic Pivoting Grip Safety (see FIGS. 5d–5e) FIG. 5d shows the outline of an alternative pivoting safety and abutting slide extension and related slide and grip-interior features. Unless it is depressed, this safety is always "on" because its curved elastic beam automatically rotates it into position to prevent movement of the slide toward release of an engaged bolt. The thumb-web safety, 70, has a tang, 70-1, which, in "on" position, prevents moving the slide in a direction to release an engaged bolt. The tang blocks movement by mechanical interference with the proximal face of the trigger extension; 63b indicates the trace of the extension. The tang overlap distance with the slide trigger 63 in the safety "on" orientation is indicated as L70-2. The trigger-contact portion of the tang is approximately the same thickness as the extension flange 63. The pivoting safety is mounted on an interior axle pin extending between the mating halves of the handgrip. The axle pin may be molded integral with one or more of the halves or a separate fastener. The axle pin, 73, defines the pivot axis, 72, of the safety; the safety includes a fitted axle boss, 71, which: (a) allows precise, low-friction rotation into the "off" orientation and (b) provides stable "on-orientation" support for the safety against release-direction forces applied to the trigger. By control of mechanical tolerances, especially of the axle and axle-boss hole, the tang, in its "on" orientation, is aligned to resist release-direction forces of 10–50 N applied to the trigger.

The pivoting safety includes a curved, elastic-beam portion, 70-3, and a slideable ball-tip, 70-4; the ball-tip is provided with a smooth surface and configured to slide along a smooth plane defined by an internal travel-limit surface, 70-5, of the handgrip interior during safety rotation. The trace of this fixed interior feature re the safety is indicated by a dashed line. The elastic-beam portion is shaped to require a slight pre-load deflection against the limit-surface 70-5 in order to insert the axle-pin into the boss hole during assembly of the safety. For many polymers the safety may be molded as one piece. Alternatively, the pivoting safety may be formed of metals or alloys through the use of known processes, including welding/bonding of two or more parts. The pivoting safety may also be prepared as a composite, i.e., by insert-molding of a metal spring portion into a polymer section. The curvature and transverse section-area of the beam portion, 70-3, are configured for the elastic limit and modulus of the particular material selected for the safety.

In order to be able to move the trigger to release an engaged bolt, the safety must be rotated clockwise into its "off" orientation by application of a force, F74, to the tab 74 which extends out of the handgrip. Until F74 exceeds the predetermined pre-load value, which is defined by the free shape and stiffness of the elastic portion, no safety rotation is possible. When a force sufficient to cause rotation through a minimum angle A70 is applied, the tang will be rotated clockwise (downward) and out of the path of the trigger; the initial-movement and full-release torques are arranged at values which fall within the range of typical user-hand-grip strength. A rotation travel-limit stop, 70-6, which is a planar surface fixed into the interior of the handgrip, prevents overstress of the elastic portion when full "off" rotation is accomplished. The dashed line 70-6 indicates the trace of this stop re the safety. When the safety is in its full "off" orientation, the elastic portion is deflected from its "on" curvature and the tip slides along the limit-surface a distance L75.

By considering relevant human-hand and finger data, the tab portion 74 is positioned so that the web of skin between the user's thumb and index finger abuts the tab 74 and applies force sufficient to rotate the safety from "on" to "off" when the handgrip is firmly clasped. Alternatively, the user may choose to operate the tab 74 with his other hand.

Tether & Tether Store (6 & 5, see FIG. 1a) Tether 6 is the flexible filamentary member that connects from the launcher to the bolt and transfers tug force to pull a cable back to the launch point. Tether for the present invention can be any type of known flexible wires or filaments including braided or twisted yarns produced by many suppliers from natural or synthetic substances for many different purposes.

Tether Dimensions & Properties. Properties and characteristics of tether are given in Table 1. Many synthetic fibers are extruded from a liquid and the resulting profile of the filament is not a circle but rather in irregular form such as cloverleaf. In the textile industry, the size of yarn is defined by the tex, which is the mass in grams of a 1000 meters. The breaking strength of typical polymer monofilaments, Te6, is sometimes given in pounds-force to elongate a std. specimen to rupture. For most cable pulling, the dry tenacity, typically reported in psi, of the tether is an important property and must be determined by measuring the fiber section area and breaking force. Typical cable pulling tether is a known oriented-polymer monofilament rated for tension loads up to about 5–10 N.

Tether-Store Types & Mountings. Tether can be wound and stored on a reel or on a spool/mandrel; for certain applications it may be desirable to hold and store tether in a loose, non-tangled coil. For the present invention, known spinning reels are useful for storing 5–50 m lengths of tether having a breaking strength of about 10 N. Reels and winders are produced by many suppliers for many different industrial or sporting purposes.

Method of Launcher Use for Cable Towing

Setup Steps. The first step in cable is to select the launcher components for a specific application from those available in the field kit. Field kits are provided with instructional text and graphic materials to guide the user in selection of components for specific distances and pull loads. Operating instructions may be in the usual print form with formulas, diagrams and tables. Alternatively, instructions may be provided in the form of a programmed calculator with entry keys and text/graphics displays. Such instructions are derived from tests of sets of combined components and from interpolation by mathematical models. The first step involves defining the separation distance and the expected tugging force required to pull cable back from the target. The launcher kit may be configured to include a plurality of pre-assembled launching devices each with a different power spring and a differing tether tenacity. Alternatively, the kit may be fitted with a single launcher body and interchangeable power springs and interchangeable tether stores. In either method, the distance and tugging strength define which bolt, power spring and tenacity must be gathered and configured for use.

Bolt Insertion Steps. Manual insertion of the bolt into the configured launcher and selected power spring may involve forces of up to 25 N to be exerted upon the loop end of the bolt. The launcher must be securely held or clamped to accomplish this step safely. Care should be taken, by trial, partial insertions, to assure that the hoop securely engages the desired bolt notch(es). Once the bolt is inserted and fully engaged, the trigger slide should be secured by the integrated latch or an approved external device. The bolt should be pointed toward the ground prior to aiming and targeting.

Bolt Launch Steps. The goal of this stage is to direct the bolt axis toward the center of the target area and to aim or tilt the bolt axis upward or downward to assure the distance will be correct. Aiming as used herein means judging or measuring distance, elevation and directional orientation to assure that the expected bolt trajectory will correspond to the target zone. The appropriate trajectory-elevation details are provided in the specific descriptive materials for the springs, tether and the bolt notches in the kit. The launcher is either hand held or clamped as recommended in the use instructions. Once the target is cleared of other workers and delicate devices, the slide safety devices must be released and then the bolt is carefully released.

Cable Attachment & Tow Back Steps. At the target zone, typical 6 mm OD network or coaxial cable can be easily threaded through the bolt loop and formed into a simple hitch to support the tugging forces. For extra security, the cable end can also be taped; forming the tape wrap into a smooth shape with no protrusions is also helpful to reduce tugging problems. Once a free length of cable is laid out in a coil at the target zone, usual pullback resistance is less than 5 N.

ALTERNATIVE EMBODIMENTS & EXAMPLES

Example A

Azimuth-Elevation-Illumination. The present invention is sometimes used with known aiming devices having graduated scales or other visible displays, for both direction and tilt. These devices are in the form of a base with a mating mount which attaches to the handgrip or body exterior. FIG. 1*a* illustrates a known aiming device such as a collimated light, a laser or a sighting tube 80 mounted in a breech collar 1-3. Also shown is an alternative embodiment, 80*a*, attached to the handgrip; this known system includes a tilt control, 82 for elevation (target range) and a direction control 83 (target compass reading). Both controls can be set and or displayed manually. The aiming device/system can also be fitted with an aimable/sweepable flashlight to illuminate possible interior hazards and the target zone.

Example B

Apparatus-Carrying Bolts. The present invention is sometimes used with bolts having a known internal signalling device such as a continuous or intermittent visual or audible signal easily detectable by the user during or at the end of the trajectory. Alternatively the bolt is prepared with a known electromagnetic positioning device which signals bolt position-coordinates after landing. In both cases, the attached or encapsulated signal devices are positioned adjacent the distal portion of the bolt to enhance the location of the bolt center of mass toward its forward tip. Many other types of known remote-controlled apparatus are attachable on or into the present bolt to enable execution of difficult and dangerous operations from a safe distance.

Example B1

Figure 1D:
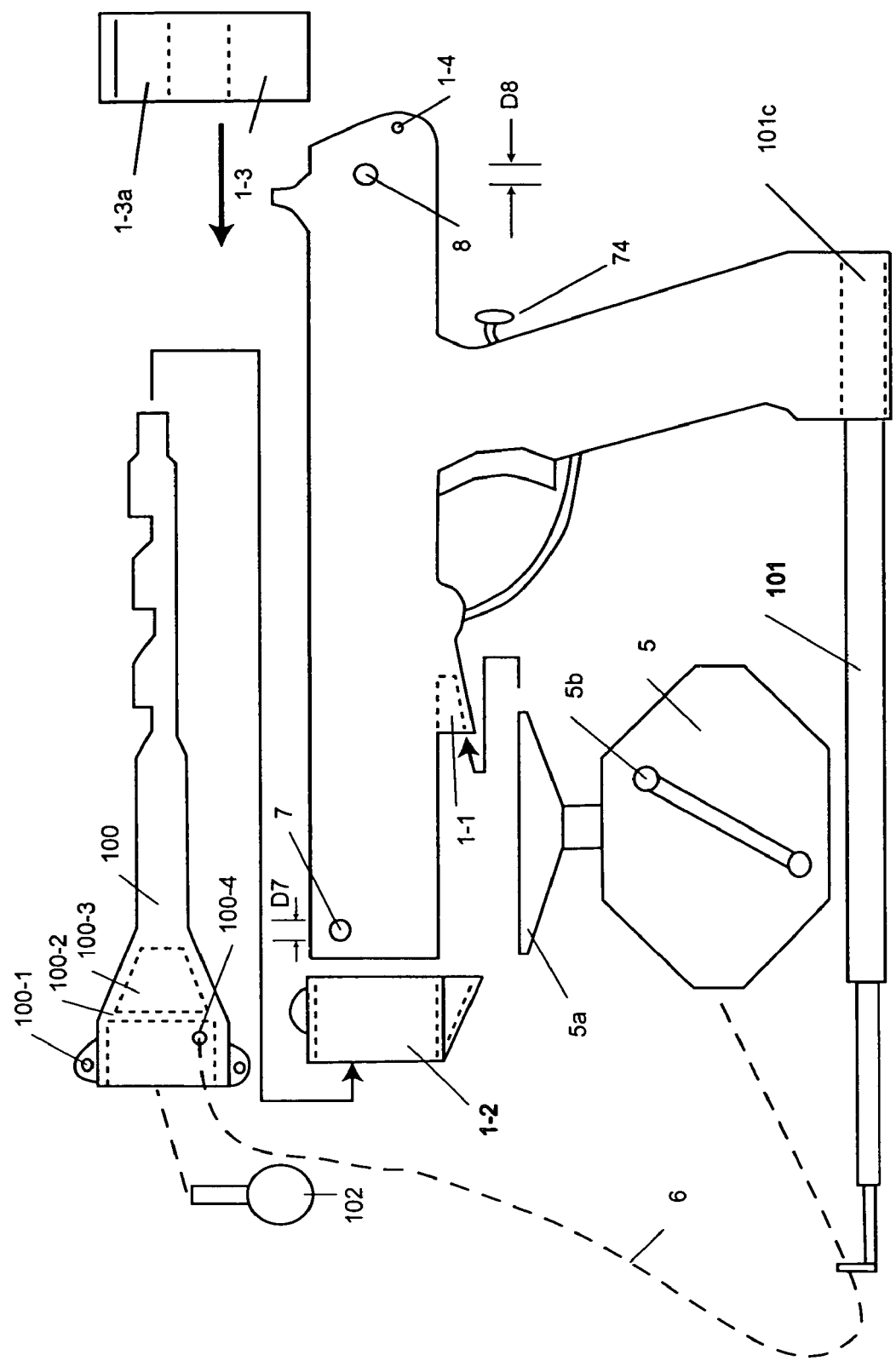
FIG. 1d is a side view of an apparatus-carrying bolt and selected, optional launcher attachments including: bolt-attached apparatus, telescoping rod with end-eye guide for tether, breech collar with socket for aiming accessory and spare bolt.

Launcher and Bolt for Fishing. An alternative apparatus-deployment embodiment of the present launcher is illustrated in FIG. 1*d*. The device-carrier bolt 100 is provided with: one or more spaced-apart and upward-facing notches, a sealed hollow compartment 100-2 of sufficient volume to make the bolt and attachments buoyant in water, one or more eye-tabs 100-1 for attachment of line or leader, an open-ended distal cavity for receiving and transporting a device package 102 from the launch point to the target zone. The device package is provided with a subassembly consisting of known weights, hooks and attractant devices and retained in the distal cavity in a compact configuration by water-fugitive wraps or ties. The launcher handgrip is provided with an optional socket to mount a short (approx. 0.2 m length), removable, telescoping rod 101 capable of extension to approximately 1 meter length and fitted with a distal eye through which the tether 6 is threaded as shown. From the distal eye, the tether is connected to the device package by passing from the outside to the inside via the through-wall aperture 100-4.

The fishing-configured launcher version is readied for use by the following sequential steps: extending the rod to full length, inserting the device package so that it is retained within the bolt distal cavity, inserting the bolt into the launcher to engage the desired notch against the power spring, aiming toward the target zone and releasing the bolt.

Example B2

Figure 7B:
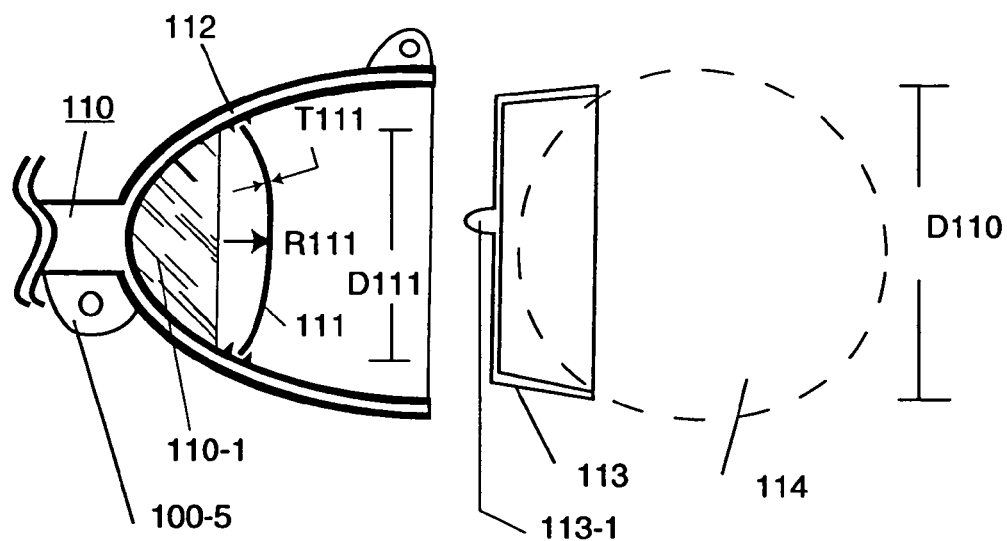
FIG. 7b is a partial sectional view of the distal portion of an alternative, active carrier bolt; the section view shows the thin ellipsoidal shell which forms the bolt cup. The device-carrier bowl and device-package outline trace are also shown in section view.
Figure 7A:
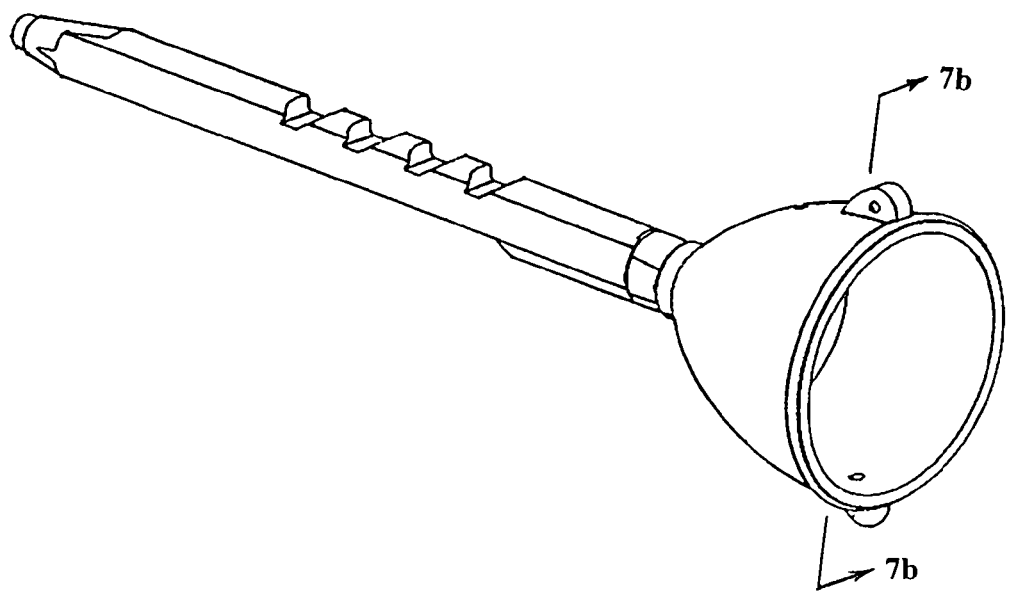
FIG. 7a is an isometric view of the device-carrier bolt; the section-direction indicators for FIG. 7b are also shown.
Figure 8A:
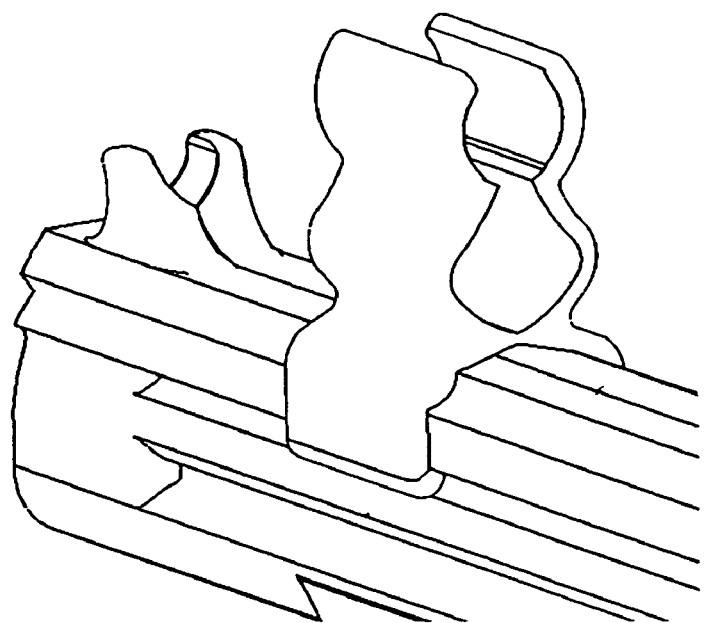
FIG. 8a is a partial, cut-away, isometric view of the breech collar and aiming-device socket.
Figure 8B:
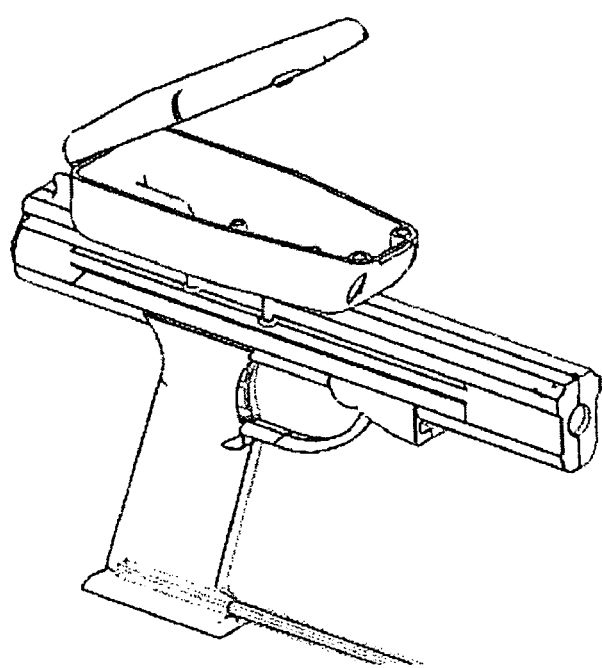
FIG. 8b is a partial, cut-away, isometric view of the launcher with a removable, body-attachable storage box for multiple, interchangeable fishing articles including device packages, hooks, weights, lures; the box is provided with a hanged cover which may be of transparent material.

Buoyant, Active Carrier Bolt with Actuator for Package Release. Another alternative apparatus-deployment bolt of the present launcher is illustrated in FIG. 7; this embodiment includes a positive-expulsion actuator which delivers a device package from the bolt distal cup either: (a) along the trajectory or (b) as the bolt reaches the target. To assure optimal flight characteristics of the combined active bolt and device package, the tether should be attached as far proximal, i.e., behind or aft, of the center of mass of the assembled components in flight. This situation is achieved by attaching the tether end to: (a) the proximal tip opening of the bolt, (b) a user drilled hole through the distal-cup wall or (c) a user-drilled hole in the bolt shaft. The carrier bolt cup is prepared with a tether-tie lug, 100-5, which positioned on its exterior, down-facing surface at the base of the bolt cup; this attachment is located approximately at the center of mass for a compact, typical package weighing less than 100 grams.

The actuator element is shown generally as curved, thin disk 111, or spherical sector. Other shapes including ellipsoids and conics of revolution are also useful. In order to provide multiple and/or quasi-stable deflection stages, the surface may also be formed with one or more concentric-rib features. The buoyancy capsule, 110-1, may be either: (a) porous material such as balsa wood or polymer foam or (b) a thin, hollow chamber; this capsule is securely fixed into the proximal interior portion of the bolt cup. The open end of the bolt cup is generally circular with an internal diameter D110. The general trace the device package is shown as a dashed line, 114. A rigid package may be configured to fit with light friction into the end of the bolt cup where it is retained during the bolt trajectory from the launcher toward the target. Since the amplitude and force of the actuator movement is limited, it is necessary to provide a low-loss interface between the package to be delivered and the actuator. An optional device carrier bowl, 113, is provided for compliant, loose or soft device packages; this bowl is prepared of stiff, light material and fitted to slide completely out of the bolt cup upon actuator movement. The bottom of the bowl is provided with a tup extension, 113-1, which is brought into contact with the actuator surface just prior to launching; for convenience, the bowl may be prepared as a replaceable/disposable component. Light friction interference is used to ensure reliable coupling between the tackle package 114 and the bowl 113 during flight; a small fugitive, or water soluble, tie might also be used.

For an embodiment including a simple elastic diaphragm, the actuator may be made of many different elastic materials including metal, alloy or polymer. The curvature, diameter, thickness and elastic modulus of the curved actuator are R111, D111, T111 and M111 respectively. An elastic diaphragm spring actuator is retained into the bolt cup by a fitted groove, 112, which accommodates slight changes in diameter which result from deflection of the disk from its original "free" shape. Such simple actuator bolts would be attractive for fishing, where the device package to be delivered may include a weight, leader-line, lure, and hook(s).

In one configuration of this embodiment, the elastic element is deflected from its original free curvature by the inertial-mass forces exerted by the moveable device package upon the diaphragm. Elastic restoration by the deflected element thus begins early in the flight and may continue throughout the trajectory.

In another configuration of this embodiment, the elastic element is displaced to a quasi-stable deflection state just prior to loading the tackle package. This step is accomplished using a jig or hand-held guide to deflect the element. At the end of the trajectory, the impact of hitting the target, even the water surface, releases the element and thus the package is expelled, by the stored energy, from the bolt cup. For convenience and safety inserting the package into the bolt cup, a fitted, shape-configured fishing tackle carrier bowl, 113, for the specific tackle to be displaced is useful.

For an bolt embodiment including a curved, bi-metal diaphragm and used for fishing, the actuation temperature and available displacement can be selected for local conditions, i.e., air temperature and water temperature. For this embodiment, the field kit would include several bolts, each adapted for a different season.

Further alternative bolt embodiments including a shape-memory actuator and used for fishing, offer additional advantages compared to two options described above, i.e., the actuator is a shape-memory material incorporated in the manner of a scaffold into the tackle, e.g., into the lure—and opens upon water contact—its components expel the tackle from the cup and release the tip of the hook which is shielded or enclosed for handling safety during arming, loading and bolt flight toward the target. In this case, the armed actuator would be releasably coupled to an interior feature of the bolt cup so that the package is not lost during flight. Upon contact with water at the element-actuation temperature, the hook and packaged tackle are propelled completely out of the cup.

Example C

Component Kits for Customization and Special Purposes. Many diverse embodiments of the present launcher for cable tugging are possible using a kit of selected components such as bolts, power springs, tether strength, tether store and aiming accessories.

Layout of a typical field-portable component kit is illustrated in FIGS. 6*a*–*d*. One or more trays presenting kit-arrays of components, along with relevant technical data, in printed or digital form, are stacked for quick access in a closeable carrying case. Other known configurations and packaging such as tool-rolls with pockets and bench-top utility boxes with separate drawers are also useful.

Example C1

Graded Array of Field-Interchangeable Power Springs. Springs of selected length and rate are available to provide chosen power to propel the bolt and playout of the tether. FIG. 6*c* illustrates a kit tray for presenting an array of power springs, 90, of common free OD but of different lenths and rates; technical data provided adjacent each PS guides the user for elastic chararacteristics and range-bolt-tether combinations.

Example C2

Figure 6A:
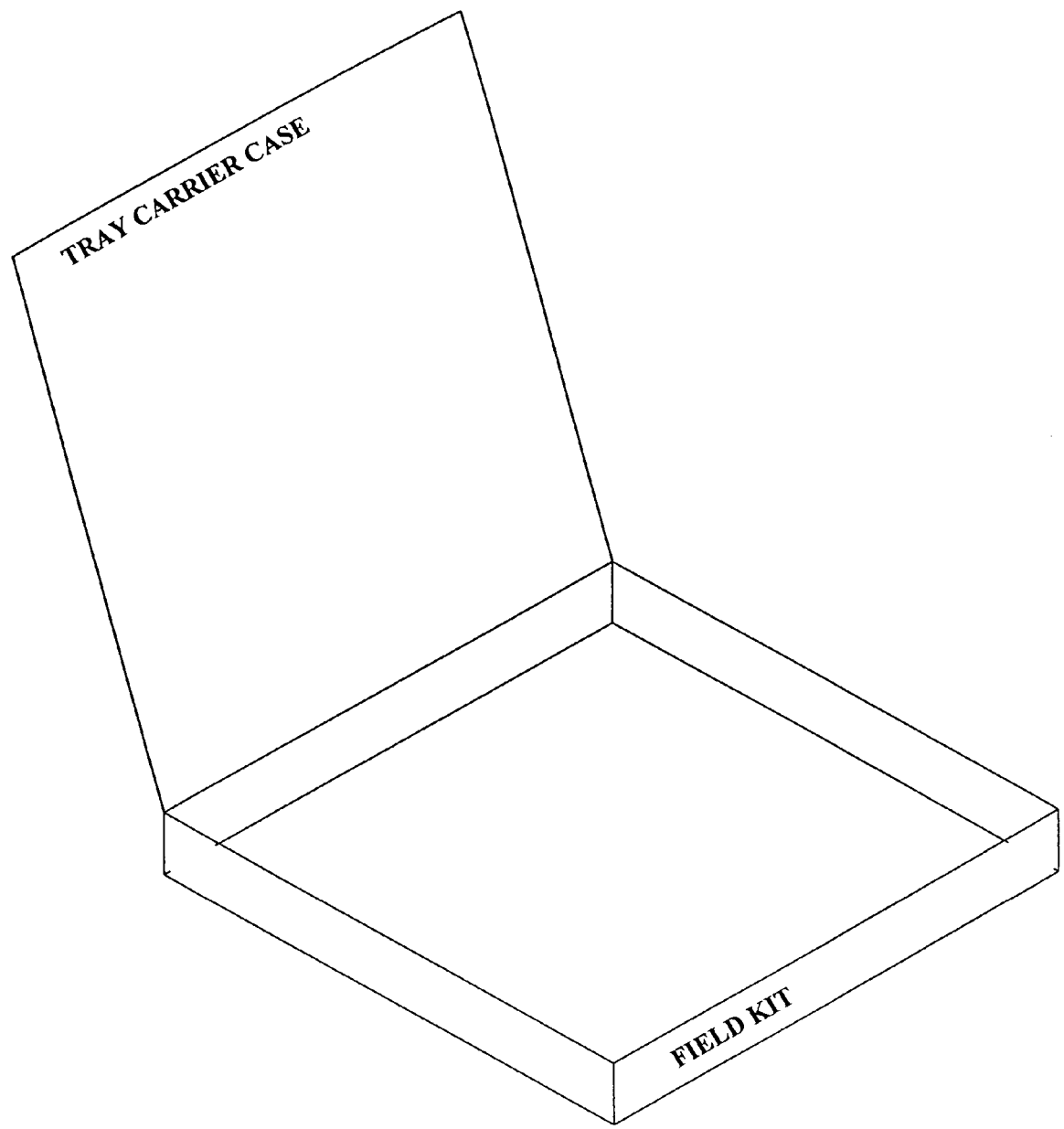
FIG. 6a is a schematic isometric view of a launcher-kit carrying case adapted to carry several stackable trays of field-configurable components to facilitate adaptation of the launcher and bolt for specific cable-tugging requirements. Illustrative tray layouts of components are shown in FIGS. 6b–6d.
Figure 6B:
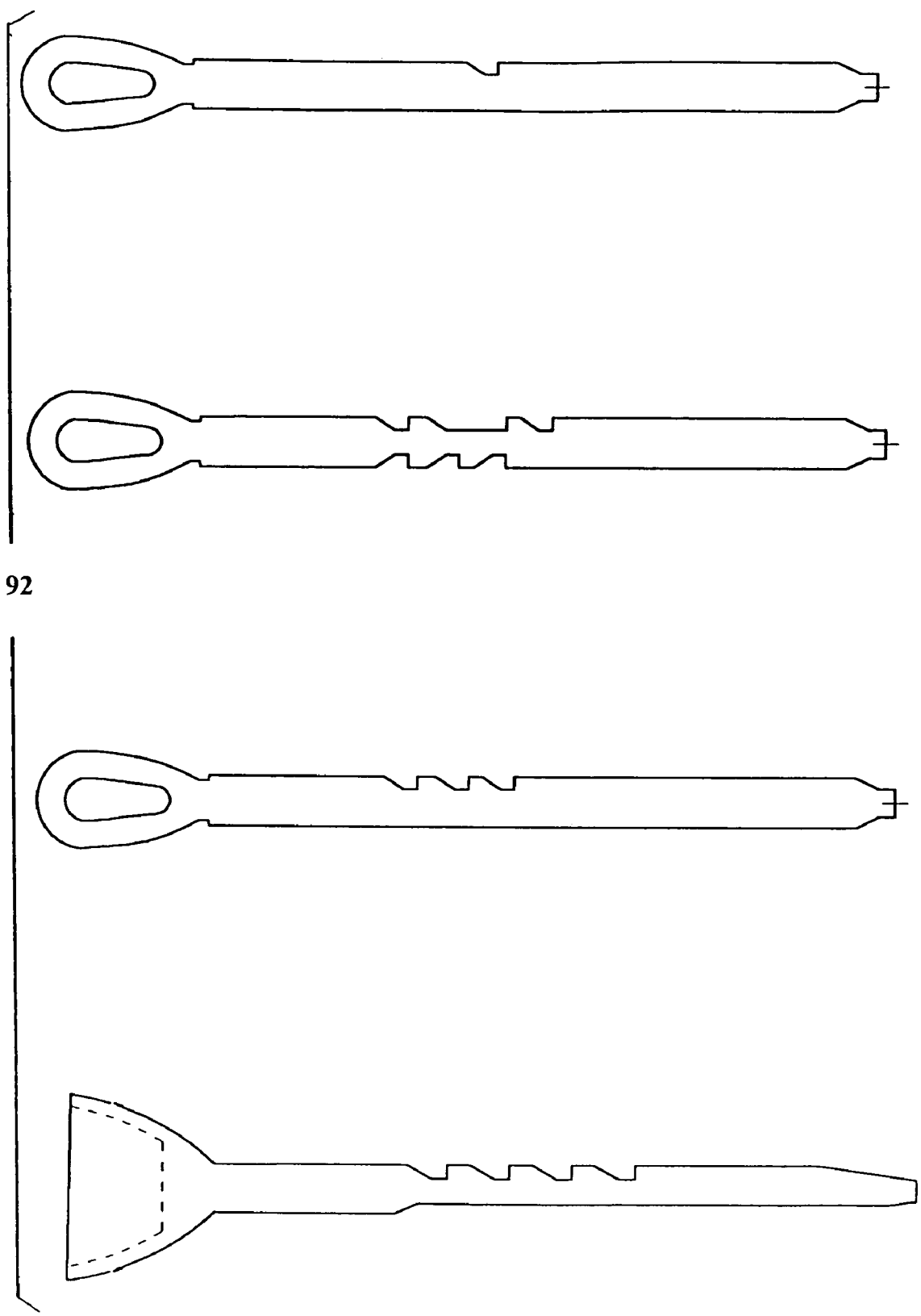
FIG. 6b is a schematic view of a kit-tray including a typical array of alternative bolts.

Graded Array of Bolts Having a Specific Range and Trajectory. FIG. 6*b* illustrates a typical bolt array, 92. Such bolts are matched with a specific power spring, tether and tether store to achieve a selected bolt range and trajectory; these bolts are provided with a selected mass/CG combination and a single or multiple custom notch positions. Technical descriptions of the characteristics of the range-specific bolts are provided in the use instructions or on the tray adjacent each bolt.

Example C3

Array of Reel-Type Tether Stores Each Having a Different Spliced-Composite Tether Combination. The composite tethers are prepared by splicing a light resilient outboard tether portion of sufficient length to reach the target to a stronger, heavier portion to tug the cable back from the target zone. This bolt-tether-tether store combination is a version of the bolt array shown in FIG. 6*b*. In this case, however a tether having selected properties is attached to a bolt with a selected notch pattern to facilitate use for specific target ranges and specific tugging force requirements. This embodiment also includes a selected tether store to hold the selected tether or spliced-tether.

Example C4

Handgrip-Attachable Aiming Base. In addition to bolts with specific range/trajectory characteristics disclosed in C2 above, targeting accuracy can be further enhanced with a removable aiming system which attaches to the handgrip portion of the launcher and provides known visual indicators or protractor-type angle scales to measure elevation and azimuth orientation; see FIG. 1a. Technical data on the aiming devices and procedures are provided in the instructional materials for the user.

Example C5

Bolt with Integrated Visible Signaling System. Because many cable-tugging environments have very low light levels, using a bolt fitted with an integrated, known reflective or active-visible signal device is an advantage; see FIG. 1a.

Example C6

Figure 6D:
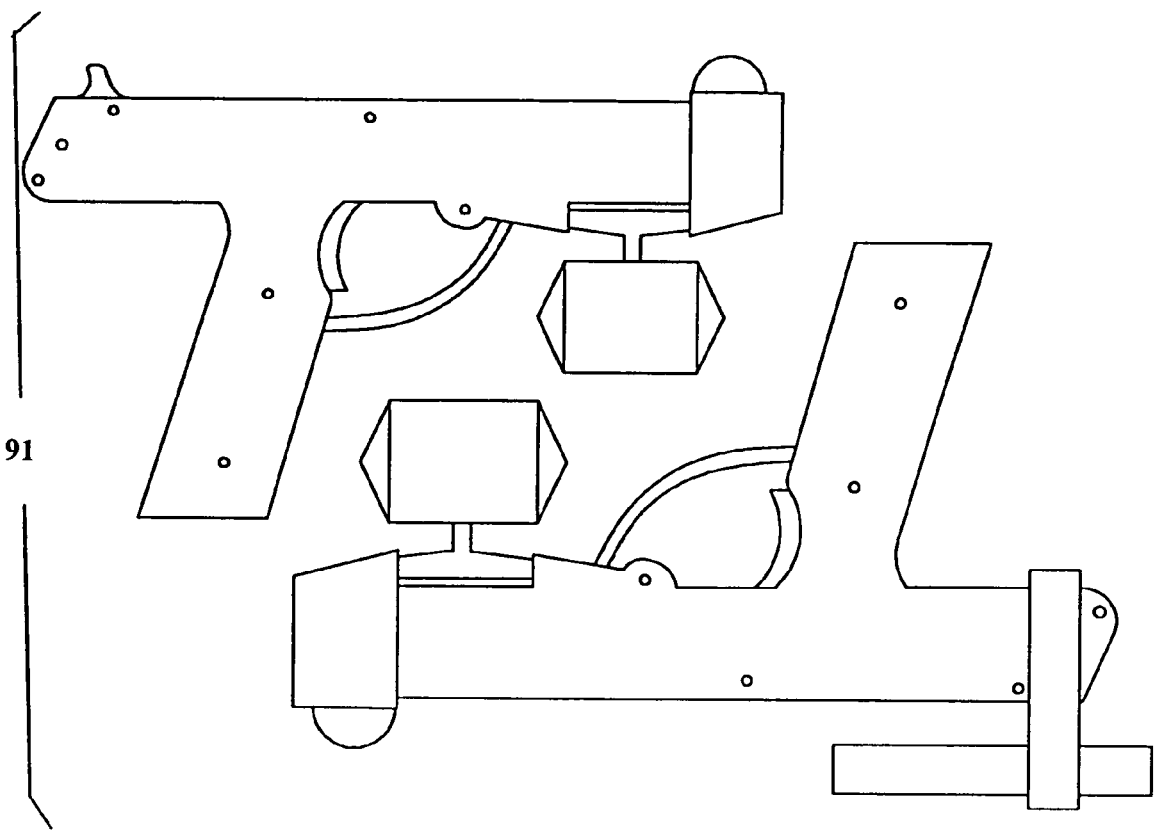
FIG. 6d is a schematic view which illustrates a typical array of two prepared launcher-PS-tether store configurations.

Array of Launchers with Different PS Characteristics, Each Optimized for Selected Specific-Range Bolts. FIG. 6d illustrates a typical tray with a launcher array, 91. Each launcher is prepared with a specific power spring, tether strength-length and an appropriate tether store to achieve a selected bolt range and trajectory with a range of selected bolts such as shown in FIG. 6b. Technical descriptions of the characteristics of the range-specific bolts and detailed use instructions for specific bolt-notch patterns are included to guide the user.

TABLE 1

NOMENCLATURE, DIMENSIONS, VALUES AND INDICIA

| Indicia | | FIG. | Typical Value | Scaling Range |
|---|---|---|---|---|
| | BODY FEATURES | | | |
| 1 | body, general | 1a | | |
| 1-1 | tether store (TS) socket | 1a | | |
| 1-2 | barrel collar w. TS socket (BS) | 1a | | |
| 1-2a | BS socket for spare bolt | 1a | | |
| 1-3 | breech collar w. aiming-device socket | 1d | | |
| 1-4 | retainer-ring hole | 1d | | |
| 2 | guide tube (GT) | 1b | | |
| D2 | GT diam., mm | 1b | 12.2 | 8–20 |
| A2 | GT cylinder axis | 1b | | |
| 3 | slide channel (SC) | 1b | | |
| A3 | SC centerline | 1b | | |
| 4 | follower spring channel (FSC) | 1b | | |
| A4 | FSC axis | 1b | | |
| D4 | FSC cyl. diam., mm | 1b | 6.1 | 1.1 * D50, min |
| 5 | tether store w. mount ears | 1a | | |
| 6 | tether, general | 1a | | |
| 7 | hoop-trunnion sockets (HTS) | 1a | | |
| D7 | HTS diam., mm | 1a | 6.5 | 3–8 |
| 8 | rocker trunnion sockets (RTS) | 1a | | |
| D8 | RTS diam., mm | 1a | 5 | 4–8 |
| 9 | handgrip | 1a | | |
| 9g | trigger guard | 1a | | |
| | POWER SPRING & PLUGS | | | |
| 10 | power spring (PS) general | 2 | | |
| D10 | PS free OD, mm | 2 | 12 | 10–15 |
| L10 | PS free length, mm | 2 | 168 | 125–225 |
| LS10 | PS solid length, mm | 2 | 40 | 30–50 |
| F10 | PS rate, N/m | | ~910 | 500–2000 |
| W10 | PS wire diam, mm | 2 | ~1.4 | 0.8–1.9 |
| Rg10 | GT-to-PS radial gap, mm | 2 | ~0.1 | 0.05–0.2 |
| 11 | distal plug (DP) general | 2 | | |
| DL11 | DP larger section diam., mm | 2 | 12 | 0.99 * D10, max |
| LL11 | DP larger section length, mm | 2 | 11.5 | 5–15 |
| LS11 | DP spring wrap length, mm | 2 | ~8 | 4–10 |
| DS11 | DP smaller section diam., mm | 2 | 9.5 | 8–12 |
| Rg11 | DP-to-GT radial gap, mm (approx.) | 2 | ~0.1 | 0.05–0.2 |
| 12 | proximal plug (PP) general | 2 | | |
| DL12 | PP larger section diam., mm | 2 | 12 | 0.99 * D10, max |
| DS12 | PP smaller section diam., mm | 2 | 9.5 | '7–12 |
| Rg12 | PP-to-GT radial gap, mm (approx.) | 2 | 0.1 | 0.05–0.2 |
| 13 | proximal plug extension (PPE) | 2 | | |
| A13 | PPE cylinder axis | 2, 5a | | |
| D13 | PPE diam., mm | 2 | 6 | 4–10 |
| L13 | PPE length, mm | 2 | 13 | 10–15 |
| AO13 | PPE axis offset re GT axis, mm | 2 | 3 | 1–6 |
| | BOLT | | | |
| 20 | bolt (B), general | 3a | | |
| L20-1 | B overall length, mm | 3a | 160 | 140–220 |
| L20-2 | B overall section ht., typical, mm | 3c | 12 | 8–18 |
| 21a | bolt shank section (BSS), type-1 | 3a | | |
| 21b | bolt shank section (BSS), type-2 | 3h | | |
| L21a | BSS section-ht., min, mm | 3d | ~6 | 5–12 |
| L21b | BSS section-ht., max, mm | 3e | ~10 | 8–15 |

TABLE 1-continued

NOMENCLATURE, DIMENSIONS, VALUES AND INDICIA

| Indicia | | FIG. | Typical Value | Scaling Range |
|---|---|---|---|---|
| 22 | B distal tip, general | 3a | | |
| 23 | bolt proximal tip (BPT), general | 3a | | |
| 23a | BPT tether hole-1 (horiz.) | 3a, 3f | | |
| 23b | BPT tether hole-2 (vert.) | 3a, 3g | | |
| D23 | BPT tether hole diam., mm(approx) | 3a, 3f, 3g | ~0.5–1 | |
| 24 | bolt notches (BN), general | 3a | | |
| L24a | BN proximal-tip spacing, axis, mm | 3a | 58 | 20–100 |
| L24b | BN typ. adjacent spacing, axis, mm | 3a | 10 | 10, min |
| L24-2 | BN depth, mm | 3a | 3 | 2–4 |
| An24-3 | BN entry angle, deg., approx. | 3a | ~100–130 | 90–150 |
| An24-4 | BN latch angle, deg., approx. | 3a | ~90–100 | 80–120 |
| 25 | bolt distal loop (BDL), general | 3a | | |
| D25-1 | BDL diam., mm | 3a | 22 | 15–40 |
| D25-2 | BDL section diam, mm | 3b | 7 | 5–9 |
| 25b | BDL transverse bar, general | 3a | | |
| 26 | bolt tether tunnel (BTT), general | 3a | | |
| L26-1 | BTT width, mm (approx) | 3a | 0.5–2 | 1.1 * D6, min |
| L26-2 | BTT depth, mm (approx.) | 3c | 0.5–2 | 1.5 * D6, min |
| 27 | bolt center of mass | 3a | | |
| | HOOP | | | |
| 30 | hoop, general | 4a, 4b | | |
| 31 | hoop trunion (HT), general | 4a | | |
| D31 | HT diam., mm | 4b | 6.4 | 5–9 |
| 32 | hoop claw (HC), general | 4b | | |
| A32 | HC angle at release, deg.(approx.) | 4a | ~80–90 | 75–95 |
| 33 | hoop pin (HP), general | 4a | | |
| L32 | HT-HC lever arm, mm (approx.) | 4b | 5.5 | 3–9 |
| L33 | HT-HP lever arm, mm (approx.) | 4b | 22.5 | 18–30 |
| A30 | hoop rotation range, deg.(approx.) | 4b | ~10.5 | 7–15 |
| | ROCKER | | | |
| 40 | rocker, general | 5a | | |
| 41 | rocker trunnion (RT), general | 5a | | |
| D41 | RT diam., mm | 5a | 4.5 | 3–6 |
| 42 | rocker-PPE contact face | 5a | | |
| L42 | RT-PPE lever arm, mm | 5a | 3 | 2–5 |
| 43 | rocker-FS contact face | 5a | | |
| L43 | RT-FS lever arm, mm | 5a | 12 | 10–15 |
| 44 | rocker CCW travel stop | 5a | | |
| | FOLLOWER SPRING | | | |
| 50 | follower spring (FS) general | 5a | | |
| D50 | FS free OD, mm | 5a | 6 | 4–8 |
| L50 | FS free length, mm | 5a | 35 | 20–40 |
| LS50 | FS solid length, mm | 5a | 15 | 10–25 |
| F50 | FS rate, N/m (approx.) | | ~3025 | 2000–4000 |
| W50 | FS wire diam., mm (approx.) | 5a | 0.9 | 0.5–1 |
| Rg50 | FSC-to-FS radial gap, mm | 5a | 0.1 | 0.05–0.2 |
| | SLIDE | | | |
| 60 | slide (S), general | 5a | | |
| 60-1 | S, overall length, mm | 5b | 200 | 180–250 |
| 60-2 | slide section, H × W, mm | 5a | 5 × 12 | |
| 61 | slide pin socket (SPS), general | 5a, 5b | | |
| 62 | slide spring tang (SPT), general | 5a, 5b | | |
| D62 | SPT diam., mm | 5a | 4.5 | 4–10 |
| 63 | trigger extension (TE) | 5a | | |
| 63a | trace of handgrip edge on TE, engaged ho | 5a | | |
| 63b | TE proximal, safety-engagement edge | 5d | | |
| 64a | TE external safety, plug hole | 5a, 5b | | |
| 64b | TE internal safety, transverse plug & hole | 5a, 5b | | |
| | THUMB-WEB SAFETY | | | |
| 70 | pivoting, elastic safety (PES) | 5d | | |
| A70 | PES on-to-off rotation angle, deg | 5 | 5–15 | |
| 70-1 | PES tang | 5d | | |
| L70-2 | PES tang overlap against slide, mm | 5d | 0.5–3 | |
| 70-3 | PES curved-beam portion | 5d | | |
| 70-4 | PES ball end tip | 5d | | |
| 70-5 | PES ball-tip travel limit | 5d | | |
| 70-6 | PES rotation tavel limit | 5d, 5e | | |
| 73 | PES axle pin | 5e | | |

TABLE 1-continued

NOMENCLATURE, DIMENSIONS, VALUES AND INDICIA

| Indicia | | FIG. | Typical Value | Scaling Range |
|---|---|---|---|---|
| D73 | PES axle diam., mm | 5e | 2–6 | |
| F74 | PES release force, N | 5d | 0.1–3 | |
| | TETHER & TETHER STORE | | | |
| 6 | tether, general | 1a | | |
| D6 | tether diam., mm | | 0.3 | 0.2–1 |
| Te6 | tether breaking force, N | | ~5 | 2–20 |
| 5 | tether store (TS), general | 1a | | |
| 5a | TS mounting features | 1d | | |
| 5b | TS winding handle | 1d | | |
| | OTHER FEATURES | | | |
| 80 | aiming accessory, general | 1a | | |
| 80a | aiming base w. handgrip socket | 1a | | |
| 81 | target azimuth pointing device | 1a | | |
| 82 | target elevation leveling device | 1a | | |
| 84 | carrier box w. transparent cover | 8b | | |
| | KITS | | | |
| 90 | PS array, same OD, graded rate | 6c | | |
| 91 | launcher array, graded PS rate | 6d | | |
| 92 | bolt array, graded notches | 6b | | |
| | DEVICE-CARRIER BOLTS | | | |
| 100 | device-carrier bolt (DCB) | 1d | | |
| 100-1 | DCB attachment ear | 1d | | |
| 100-2 | DCB chamber sepn. diaphragm | 1d | | |
| 100-3 | DCB hollow chamber | 1d | | |
| 100-4 | DCB wall-aperture, tether passthru | 1d | | |
| 100-5 | DCB approx. mass-center tether tab | 7b | | |
| 101 | removable telescoping rod (RTR) | 1d | | |
| 101b | RTR distal tether guide | 1d | | |
| 101c | RTR socket | 1d | | |
| 102 | device sub-assy. & package | 1d | | |
| 110 | active carrier bolt | 7b | | |
| 110-1 | buoyancy capsule | 7b | | |
| D110 | DCB cup ID, mm | 7b | | |
| 111 | displacement actuator (DA) | 7b | | |
| D111 | OD of circular DA, mm | 7b | 20–40 | |
| R111 | radius of curvature of DA, mm | 7b | 50–500 | |
| T111 | thickness of DA, mm | 7b | 0.1–2 | |
| M111 | elastic modulus of thin, circular DA, GPa | 7b | 1–250 | |
| 112 | rim socket-retainer for DA | 7b | | |
| 113 | device-carrier bowl (DCB) | 7b | | |
| 113-1 | DCB coupler tup | 7b | | |
| 114 | device package (tackle for fishing) | 7b | | |

I claim:

1. Apparatus for towing an object between an origin point and a remote connection zone comprising:

(a) a body including an internal guide tube having a closed end and an open end, said body having a handle portion sized for gripping;

(b) a coiled, compressible power spring encompassed within said guide tube adjacent said closed end and provided with distal and proximal plugs attached to respective ends thereof;

(c) a stiff, elongated, notched bolt sized for insertion of a proximal segment thereof within said guide tube, said bolt having its distal end formed into one of: (i) an open loop adapted for attachment of cable and (ii) a device carrier cup adapted to hold, convey and release a device package to the connection zone said distal distal end and abutting bolt portion sized and configured to position the center of mass of the bolt adjacent said distal end;

(d) a length of tether sufficient to reach said connection zone attached to said bolt, said tether carried on a body-mounted reel adapted for playout and recovery;

(e) a body-connected, L-shaped, two-armed, pivoting-hoop actuator adjacent said guide tube open end, said actuator having one arm provided with a claw feature adapted to engage said bolt notches, the other arm provided with a hoop-pin feature on end thereof;

(f) a finger-actuated slide and slide extension adjacent said handle adapted for linear movement within a first body channel and coupled to said actuator by a socket recess mated to couple with said hoop-pin feature;

(g) a body-connected, pivoting rocker mounted for pivoting movement in said body at said tube closed end;

(h) a follower coil spring is enclosed in a second body channel adjacent said first body channel and interposed between said rocker and said slide; and whereby, upon insertion of said bolt proximal portion through said hoop actuator into said body: said claw feature is urged into engagement with a selected said bolt notch, said distal spring plug centeringly engages said bolt and attached tether, said power spring is compressed, said proximal spring plug is urged against said rocker, said rocker is urged against said follower spring and said slide socket feature is urged against said hoop actuator pin connector, and further whereby, upon subsequent application of finger pressure to said slide extension to compress said follower spring, said hoop actuator pivots to release said bolt connected to said tether and carrying the same on a flight trajectory from the origin point toward the connection zone where an object to be retrieved to origin is attached and towed back.

2. The apparatus of claim 1 configured for towing a cable from a remote connection zone comprising:
  (a) said bolt is loop type:
  (b) said tether is attached to one of: bolt proximal end and bolt distal end;
  (c) a removable-interchangeable light-support and aiming clip is positioned on breech portion of the body;
  (d) a safety mechanism, said safety mechanism being one of: internal, external and automatic; and
  (e) said body mounting socket for reel is adapted to mate with standard reel features;
whereby reel and tether are interchangeable together.

3. The apparatus of claim 1 configured for attracting, snaring and recovering an aquatic animal from a remote, aimed-for water-surface zone comprising:
  (a) an aiming feature is provided on the top of the breech portion of said body;
  (b) a body-attachable, telescoping rod and mating socket in bottom portion of handgrip,
  (b1) said rod including one or more tether eylets and extendable to a length in the range 0.2–2 m and adapted for transmitting sudden tension tugs along said tether,
  (b2) said mating socket being one of: (i) removable, secure, frictional fixation within a fitted handle socket and (ii) permanently bonded into a prepared handle opening;
  (c) an automatic grip safety;
  (d) said bolt is cup type adapted to deliver said device package and includes one of: sealed bouyancy compartment and attached buoyancy capsule;
  (e) said tether end is attached to one of: (i) bolt-cup external ear and (ii) bolt proximal tip hole;
  (f) a device package is attached to bolt-cup external ear by a leader line of predetermined length, said device package including at least: lure, hook, weight, each fixed at a predetermined position along said leader;
whereby said bolt is targeted and delivered to remote site, the device package released into the water and the aquatic animal is attracted, snared and recovered.

4. The apparatus of claim 3 further comprising:
  (a) a removable, body-attachable, closable storage box for multiple, interchangeable fishing articles including device packages, hooks, weights, lures is engaged on breech portion of said body;
  (b) said bolt cup is a device carrier type and includes a mechanical-displacement actuator, said actuator being one of: (i) elastic disk preloadable by user deflection just prior to inserting device package and (ii) a selected curved bimetal disk inherently adapted to reverse its curvature upon contact with water about 5 deg. C. below the instantaneous local air temperature;
  (c) a device package and scaffold, said device package being coupled to actuator by one of: (i) an integrated, stiff, scaffold-support element configured during its insertion for reliable retention and efficient ejection coupling at remote zone and (ii) insertion into coupling bowl adapted for reliable coupling with bolt during trajectory and efficient ejection upon water contact at remote zone;
whereby said bolt is targeted and delivered to remote site, the device package released into the water and the aquatic animal is attracted, snared and recovered.

5. In an improved apparatus for retrieving an object between an origin and a remote connection zone, apparatus including a body having an internal guide tube having a closed end and an open end, said body having a hand grip, a coiled compressible power spring enclosed within said tube adjacent said closed end, a stiff, elongated, notched bolt adapted for proximal-end attachment of a line thereto and insertion into said guide tube, thereby compressing and holding said spring as well as a releasable length of tether attached to said bolt, the improvements comprising:
  (a) a body-connected, L-shaped, two-armed, pivoting-hoop actuator adjacent said guide tube open end, said actuator having one arm provided with a claw feature adapted to engage said bolt notches, the other arm provided with a hoop-pin feature on end thereof;
  (b) a finger-actuated slide and slide extension adjacent said grip adapted for linear movement within a first body channel and coupled to said actuator by a socket mated to couple with said hoop-pin feature;
  (c) a body-connected pivoting rocker mounted for pivoting movement in said body adjacent said tube closed end
  (d) a follower coil spring is enclosed in a second body channel adjacent said first body channel and interposed between said rocker and said slide;
  (e) said power spring is provided with distal and proximal plugs attached to respective ends thereof;
whereby upon insertion of said bolt proximal tip through said hoop actuator into said body, said claw feature is urged into engagement with a selected said bolt notch, said distal spring plug centeringly engages said bolt, said spring is compressed, said proximal spring plug is urged against said rocker, said rocker is urged against said follower spring and said slide socket is urged against said pin connector, and further whereby, upon application of finger pressure to said slide to compress said follower spring, said hoop actuator pivots to release said bolt carrying said tether on a flight trajectory from an origin point toward a connection zone where an object to be retrieved to origin is attached and tugged toward said origin.

6. The apparatus of claim 5 configured for towing a cable from a remote connection zone comprising:
  (a) said bolt is loop type;
  (b) said tether is attached to one of: bolt proximal end and bolt distal end;
  (c) a removable-interchangeable light-support and aiming clip is inserted on breech portion of said body;
  (d) a safety mechanism, said safety mechanism being one of: internal, external and automatic; and
  (e) said body mounting socket for reel is adapted to mate with standard reel features;
whereby reel and tether are interchangeable together.

7. The apparatus of claim 5 configured for attracting, snaring and recovering an aquatic animal from a remote, aimed-for water-surface zone comprising:
  (a) an aiming feature is provided on the top of the breech portion of said body;
  (b) a body-attachable, telescoping rod and mating socket is provided in bottom portion of handgrip, (b1) said rod including one or more tether eylets and extendable to a length in the range 0.2–2 m and adapted for transmitting sudden tension tugs along said tether, (b2) said mating socket being one of: (i) removable, secure, frictional fixation within a fitted handle socket and (ii) permanently bonded into a prepared handle opening;

(c) an automatic grip safety;

(d) said bolt is cup type adapted to deliver said device package and includes one of: sealed bouyancy compartment and attached buoyancy capsule;

(e) said tether end is attached to one of: (i) bolt-cup external ear and (ii) bolt proximal tip hole;

(f) a device package is attached to bolt-cup external ear by a leader line of predetermined length, said device package including at least: lure, hook, weight, each fixed at a predetermined position along said leader;

whereby said bolt is targeted and delivered to remote site, the device package released into the water and the aquatic animal is attracted, snared and recovered.

8. The apparatus of claim 7 further comprising:

(a) a removable, body-attachable storage box for multiple, interchangeable fishing articles including device packages, hooks, weights, lures, said box slideable onto the breech portion of said body;

(b) said bolt cup includes a mechanical-displacement actuator, said actuator being one of: (i) elastic disk preloadable by user deflection just prior to inserting device package and (ii) a selected curved bimetal disk inherently adapted to reverse its curvature upon contact with water about 5 deg. C. below the instantaneous local air temperature;

(c) a device package is coupled to actuator by one of: (i) an integrated, stiff, scaffold-support element configured during its insertion for reliable retention and efficient ejection coupling at remote zone and (ii) insertion into coupling bowl adapted for reliable coupling with bolt during trajectory and efficient ejection upon water contact at remote zone.

9. A kit system for configuring an apparatus for delivering and retrieving a tethered bolt carrying an attached device package from an origin point to a selected, separated target location, system comprising:

(a) at least one body provided with an internal guide tube having a closed end and an open end, said body having a handle portion sized for human gripping;

(b) an array of coiled, compressible power springs, each encompassable within said guide tube adjacent said closed end, (b1) each said power spring is provided with distal and proximal plugs attached to respective ends thereof and is selected from the kit array considering the separation distance;

(c) an array of stiff, elongated, notched bolts, each having distal and proximal portions, (c1) proximal portion of each said bolt sized for insertion within said guide tube, (c2) distal portions of each said bolt provided with: (i) a open-ended, streamlined chamber adapted to carry an inserted device package and (ii) a fixed buoyancy capsule adjacent said chamber, (c3) said device package package selected from the kit array considering the specific purpose and types available and attached juxtaposed within said bolt cavity and attached thereto to by a flexible filament;

(d) said bolt and device package configured to position the center of mass of the bolt-package combination adjacent distal end thereof, (e) said bolt selected from the kit array considering the separation distance;

(f) a length of tether sufficient to reach the target attached to proximal end of said bolt, said tether carried on a reel adapted for playout and recovery, said tether and reel selected from the kit array considering the expected towing force;

(g) a body-connected, L-shaped, two-armed, pivoting-hoop actuator adjacent said guide tube open end, said actuator having one arm provided with a claw feature adapted to engage said bolt notches, the other arm provided with a hoop-pin feature on end thereof;

(h) a finger-actuated slide adjacent said handle adapted for linear movement within a first body channel and coupled to said actuator by a socket recess mated to couple with said hoop-pin feature;

(i) a body-connected, pivoting proximal rocker mounted for pivoting movement in said body at said tube closed end;

(j) a follower coil spring is enclosed in a second body channel adjacent said first body channel and interposed between said rocker and said slide;

whereby, upon insertion of said selected bolt proximal portion through said hoop actuator into said body, said claw feature is urged into engagement with a selected said bolt notch, said distal spring plug centeringly engages said bolt and attached tether, said selected power spring is compressed, said proximal spring plug is urged against said rocker, said rocker is urged against said follower spring, said follower spring is urged against said slide and said slide socket feature is urged against said hoop actuator pin connector, and further whereby, upon subsequent application of finger pressure to said slide extension to compress said follower spring, said hoop actuator pivots to release said bolt carrying said tether and attached device package on a flight trajectory from the origin point toward the target zone where, upon landing, said device is emitted for attachment of an object to be retrieved by rewinding said tether.

* * * * *